(12) United States Patent
Seally

(10) Patent No.: US 10,345,805 B2
(45) Date of Patent: Jul. 9, 2019

(54) SYSTEM FOR AND METHOD OF MAXIMIZING UTILIZATION OF A CLOSED TRANSPORT SYSTEM IN AN ON-DEMAND NETWORK

(71) Applicant: PODWAY LTD, Sheung Wan (HK)

(72) Inventor: Jonathon Seally, Punchbowl (AU)

(73) Assignee: Podway Ltd., Sheung Wan (HK)

( * ) Notice: Subject to any disclaimer, the term of this patent is extended or adjusted under 35 U.S.C. 154(b) by 107 days.

(21) Appl. No.: 15/487,313

(22) Filed: Apr. 13, 2017

(65) Prior Publication Data
US 2017/0300049 A1    Oct. 19, 2017

Related U.S. Application Data

(60) Provisional application No. 62/323,424, filed on Apr. 15, 2016.

(51) Int. Cl.
*G05D 1/00* (2006.01)
*G01C 21/34* (2006.01)
(Continued)

(52) U.S. Cl.
CPC ........ *G05D 1/0027* (2013.01); *G01C 21/3492* (2013.01); *G05D 1/0289* (2013.01); *G06Q 10/047* (2013.01); *G06Q 10/06311* (2013.01); *G06Q 50/28* (2013.01); *G08G 1/096811* (2013.01); *G08G 1/096816* (2013.01);
(Continued)

(58) Field of Classification Search
CPC ...... G05D 1/00; G05D 1/0027; G05D 1/0289; H04W 4/00; H04W 4/024; H04W 4/40; G06Q 10/00; G08G 1/00; G08G 1/096816; G08G 1/096844; G08G 1/20; G08G 1/202; G08G 1/207; G01C 21/00; G01C 21/34; G01C 21/3492
See application file for complete search history.

(56) References Cited

U.S. PATENT DOCUMENTS 4,018,410 A * 4/1977 Renaux ............... B61B 13/00
                                                    104/88.03

FOREIGN PATENT DOCUMENTS

| CN | 101395647 A | 3/2009 |
|----|-------------|--------|
| CN | 103309350 A | 9/2013 |

(Continued)

OTHER PUBLICATIONS

International Searching Authority, PCT, Written Opinion of the International Searching Authority and Notification of Transmittal of the International Search Report and Written Opinion, International Application No. PCT/CN2017/080591, Filed Apr. 14, 2017, Podway Ltd., 12 pages.

*Primary Examiner* — Yonel Beaulieu
(74) *Attorney, Agent, or Firm* — Haverstock & Owens LLP

(57) ABSTRACT

System for and method of controlling vehicles in a closed transport system. A closed transport system network controller generates a route for a requested journey, determining the commencement time of the journey from the origin point such that the vehicle executes the journey free of collisions with other vehicles in the closed transport system. The network controller provides steering and speed instructions in order for the vehicle to execute the route in the prescribed manner. The network controller controls all vehicles in the closed transport system such that, on a macro level, the capacity of the closed transport system is generally maximized.

22 Claims, 11 Drawing Sheets

(51) Int. Cl.
*G05D 1/02* (2006.01)
*G08G 1/0968* (2006.01)
*G08G 1/00* (2006.01)
*H04W 4/024* (2018.01)
*H04W 4/40* (2018.01)
*G06Q 10/04* (2012.01)
*G06Q 10/06* (2012.01)
*G06Q 50/28* (2012.01)
*H04L 29/08* (2006.01)

(52) U.S. Cl.
CPC ......... *G08G 1/096844* (2013.01); *G08G 1/20* (2013.01); *G08G 1/202* (2013.01); *G08G 1/207* (2013.01); *H04W 4/024* (2018.02); *H04W 4/40* (2018.02); *G05D 2201/0212* (2013.01); *H04L 67/12* (2013.01)

(56) References Cited

FOREIGN PATENT DOCUMENTS

| | | |
|---|---|---|
| CN | 103492968 A | 1/2014 |
| CN | 104007764 A | 8/2014 |
| CN | 105446343 A | 3/2016 |
| EP | 2942250 A1 | 11/2015 |

* cited by examiner

| Label | From | To | Data |
|---|---|---|---|
| 205 | network controller 160 | administration system 170 | Real-time network info<br>Operating logs<br>Diagnostics (e.g. CPU load) |
| | administration system 170 | network controller 160 | Human admin overrides<br>Journey requests |
| 210 | safety system 180 | administration system 170 | Real-time exception reporting<br>Operating logs |
| | administration system 170 | safety system 180 | Admin overrides |
| 215 | network controller 160 | safety system 180 | All vehicle JISs |
| | safety system 180 | network controller 160 | Re-routing requests<br>Loss of route integrity |
| 220 | administration system 170 | Vehicle 110 | Passenger support<br>In vehicle screen data |
| | Vehicle 110 | administration system 170 | Help requests<br>Passenger data (billing and security)<br>Load data<br>Interior data (e.g. video feed)<br>Exterior video feed |
| 225 | network controller 160 | Vehicle 110 | Journey Instruction Set |
| 230 | Vehicle 110 | safety system 180 | Vehicle determined location<br>Vehicle determined speed and steering<br>Vehicle collision detection data<br>Diagnostics |
| | safety system 180 | Vehicle 110 | Operational warnings (e.g. outside speed envelope) |
| 235 | Infrastructure 125 | safety system 180 | Infrastructure determined vehicle location<br>Infrastructure determined vehicle speed<br>Path integrity/continuity |
| | safety system 180 | Infrastructure 125 | Collision avoidance measures |
| 240 | Infrastructure 125 | Vehicle 110 | Vehicle sensors obtain data from infrastructure |
| | Vehicle 110 | Infrastructure 125 | Vehicle ID<br>Vehicle location and speed |
| 245 | Vehicle 110 | independent safety control system 190 | May request vehicle's speed and location data |
| | independent safety control system 190 | Vehicle 110 | Exception control |

Fig. 3A

SYSTEM FOR AND METHOD OF MAXIMIZING UTILIZATION OF A CLOSED TRANSPORT SYSTEM IN AN ON-DEMAND NETWORK

CROSS-REFERENCE TO RELATED APPLICATIONS

This application claims priority to U.S. Provisional Application having Ser. No. 62/323,424, filed Apr. 15, 2016, entitled "PODWAY CONTROL SYSTEM," which is hereby incorporated by reference as if set forth in its entirety herein.

FIELD OF THE INVENTION

The present invention relates generally to transport systems, and more specifically to enhancing capacity utilization in closed transport systems.

BACKGROUND OF THE INVENTION

Most transport systems in the present day operate with only basic levels of network-wide coordination. Only very primitive in-journey handling of excess demand exists, this typically being ad hoc in nature, which leads to results such as cars being held stationary at traffic lights, and planes delayed in holding patterns. The transport systems are typically in some form or another human-operated, and therefore subject to the cognitive processing limitations imposed by human operators. These include a limited capacity to receive transport-specific data, both in quantity and variety (e.g., the capacity to comprehend different forms of data, simultaneously); to process data; and to transmit data to one or more would-be recipients that can potentially benefit from transport-specific information.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the present disclosure provide a system for and method of controlling vehicles in a closed transport system. A closed transport system network controller generates a route for a requested journey, determining the commencement time of the journey from the origin point such that the vehicle executes the journey free of collisions with other vehicles in the closed transport system. The network controller provides steering and speed instructions in order for the vehicle to execute the route in the prescribed manner. The network controller controls all vehicles in the closed transport system such that, on a macro level, the capacity of the closed transport system is generally maximized.

More specifically, an aspect of the present disclosure provides a network controller for on-demand vehicle journeys in a closed transport system. The network controller includes a memory configured to store a weighted directed graph representing the closed transport system, and future journey data representing traffic on the closed transport system, a transceiver configured to receive a journey request from a vehicle, and to transmit control instructions, and a processor communicatively coupled with the memory and the transceiver. The processor is configured to generate a route comprising an ordered list of vertices of the weighted directed graph, based on the journey request, to determine route validity, including checking for any collision risk at each vertex of the route at a corresponding projected pass-through time for the vertex, based on the future journey data, to generate a journey instruction set comprising vehicle control instructions corresponding to the generated route, including vehicle steering data, and to transmit the journey instruction set to the vehicle.

In an embodiment the future journey data includes a future pass-through log including vertex occupancy data corresponding to journey requests received from other vehicles in the closed transport system. In an embodiment the journey instruction set further includes vehicle speed data. In an embodiment a controlled separation between vehicles, defined as a headway, is maintained in the closed transport system. In a further embodiment two vehicles projected to be separated by less than the headway causes the generated route to be determined invalid. In a further embodiment, upon determining the generated route invalid, the processor is configured to add a period of time corresponding to the headway to update the start time of the journey, and to re-determine route validity based on the updated start time. In a further embodiment, different headway values are maintained along different segments of the closed transport system. In an embodiment the processor is configured to update the future journey data to include the generated route.

According to another aspect of the present disclosure, a method of managing a plurality of vehicles for performing a requested journey on a closed transport system includes receiving, at a network controller of the closed transport system, a journey request including origin location and destination data. The method further includes determining, by a processor of the network controller, an available vehicle of the plurality of vehicles for executing the requested journey, and generating, by the processor, an allocation route to move the available vehicle from its available location to the origin location of the requesting party. The method includes verifying, by the processor, the allocation route is free of any projected collisions, generating, by the processor, an allocation journey instruction set, and transmitting the allocation journey instruction set to the available vehicle.

In an embodiment the determining an available vehicle further includes ranking the journey request amongst a plurality of pending journey requests, based on at least one scoring metric, and selecting the available vehicle according to the ranking of the journey request. In an embodiment the at least one scoring metric is selected from: a time the journey request is received; a number of passengers in the requesting party; an importance factor of the requesting party; a distance minimization value for the journey request; a capacity value of the closed transport system; and an estimated impact on arrival times of other passengers corresponding to the plurality of pending journey requests. In a further embodiment, each of the scoring metrics has a corresponding weighting factor. In an embodiment when the available vehicle is occupied, executing a pre-existing journey request, and the available location corresponds with a destination location corresponding to the pre-existing journey. In an embodiment the available location is determined based on an estimated future demand for journey requests in proximity to the available location. In a further embodiment, the estimated future demand is based on a machine learning algorithm applied to prior journeys in the closed transport system. In an embodiment verifying the allocation route is free of any projected collisions includes the network controller receiving data indicating the location of each vehicle present in the closed transport system. In an embodiment the location of each vehicle is based on sensors located within the closed transport system. In a further embodiment, the location of each vehicle is based on corresponding sensors located within each vehicle.

According to another aspect of the present disclosure, a network controller for providing control instructions to autonomous vehicles, on-demand in a closed transport system includes a memory, a transceiver, and a processor. The memory is configured to store a weighted directed graph representing the closed transport system. The transceiver is configured to receive to a journey request, and to transmit a journey instruction set of control instructions. The processor is communicatively coupled with the memory and the transceiver and configured to determine a journey route corresponding to the journey request, including a series of segments that include an ordered list of vertices and waypoints of the weighted directed graph. The processor is configured to determine distance values from an origin of the journey route corresponding to each vertex and waypoint of the journey route, to generate vehicle speed and steering values corresponding to each segment of the journey route, and to combine the vehicle speed and steering values for each segment to form the journey instruction set. The processor is configured to control the transceiver to transmit the journey instruction set to the vehicle.

In an embodiment the network controller, the processor is further configured to generate and include in the journey instruction set a waypoint time for each waypoint of the journey route, each waypoint time corresponding to an estimated pass-by time of the vehicle at that particular waypoint. In an embodiment the memory is further configured to store future journey data, including a future pass-through log that includes vertex occupancy data corresponding to journey requests received from other vehicles in the closed transport system. In a further embodiment the processor is configured to determine a start time for the vehicle to begin executing the journey route based on the vertex occupancy data.

BRIEF DESCRIPTION OF THE DRAWINGS

Embodiments of the present disclosure are illustrated by way of example, and not by way of limitation, in the figures of the accompanying drawings and in which like reference numerals refer to similar elements.

FIGS. 3A-3B is a table illustrating operating data flows between components of a closed transport system, according to embodiments of the present disclosure.

DETAILED DESCRIPTION OF THE INVENTION

Figure 1:
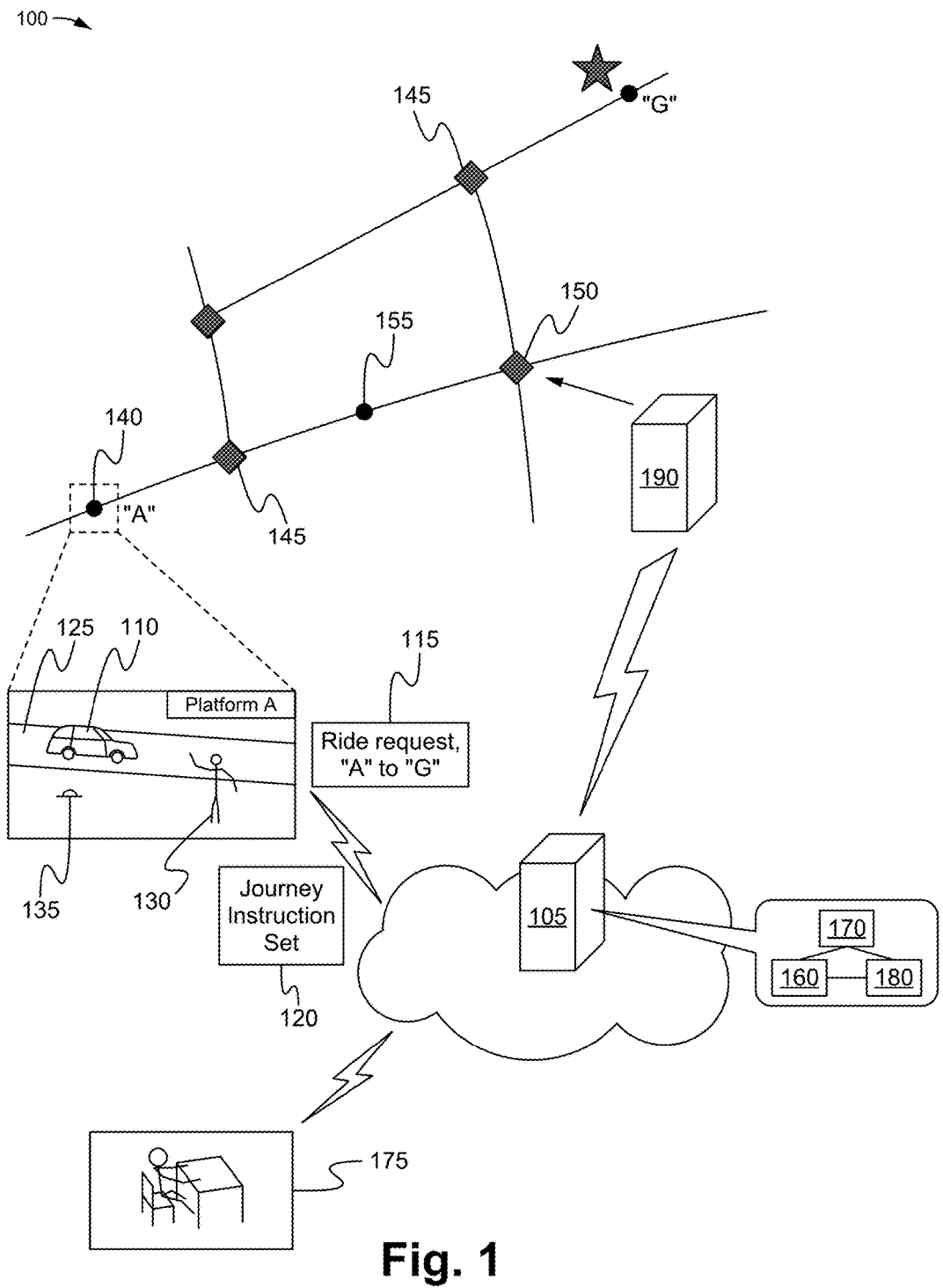
FIG. 1 is a diagram of a closed transport system according to embodiments of the present disclosure.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which can be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure can be practiced without these specific details. In other instances, well-known methods, procedures, components, and circuits have not been described in detail so as not to unnecessarily obscure aspects of the present disclosure.

The system and method according to embodiments of the present disclosure is able to match capacity supply and demand across a closed, on-demand transport system ("the network"), and to control the network to deliver significant improvements in capacity, efficiency and service compared to conventional approaches.

Several characteristics distinguish the system of the present disclosure from those of conventional approaches. Rather than being human-controlled, a network control system (e.g., network control system 105 of FIG. 1) is fully computer-controlled, commanding computer-controlled vehicles. This enhances the precision with which vehicles of the system can operate, due to significantly finer measurement tolerances and calculations. The network control system has higher levels of planned network control, completely controlling the network and vehicle journeys within it end-to-end. The network infrastructure has a higher capacity than would be possible using conventional approaches, as the network control system is capable of running huge numbers of vehicles (potentially hundreds of thousands) simultaneously at full section speed. In order to achieve this capacity utilization, the system executes under finer operational tolerances than a human is capable of executing, by precise computer-control of vehicles—especially in intersections. This increased capacity, along with system-wide control of all vehicles in the network generating shortest paths and minimal acceleration/deceleration waste, increases the aggregate energy efficiency of vehicles in the system. Indeed, vehicles in the network are able to be reduced in size compared to a typical vehicle today, leading to further efficiencies in reduction of wasted vehicle space (unoccupied spaces), reductions in resources to manufacture the vehicles, and operational efficiencies. The network of vehicles is less expensive to operate, with a lower accident rate, lower consumption of consumables, less expensive infrastructure, and reduced wages. Additionally, customer travel experience and convenience is improved, with reduced journey times and waiting.

In the present description terms are used in this document as defined below:

Headway—the separation between the nose of one vehicle and the nose of the following vehicle. Typically measured as a time interval, but can also be measured as a distance. The headway is not necessarily the same across the entire network (e.g., can be different for different segments).

Gap—the separation between the tail of one vehicle and the nose of the following vehicle. This is typically measured as a distance, but can also be measured with time.

At grade—when transport modes share a physical space, e.g., pedestrians, bicyclists, cars and delivery trucks sharing the same area in a mall car park.

Grade separation—where a mode of transport is the only one that occupies a particular physical space, e.g., a subway tunnel.

Medium—each transport system runs across a medium (e.g., roads for cars or tracks for trains).

Journey Instruction Set—the strictly formatted control command data provided to a vehicle to allow it to complete a journey. Includes, for example, one or more of: trajectory, bearing, direction, distance, location, altitude, steering profiles, timing and speed profile (acceleration and deceleration) data.

Vehicle (e.g., pod)—a load carrier (generally autonomous) capable of receiving a Journey Instruction Set and executing the commands to traverse a predetermined pathway precisely.

Graph—Representation of a set of predefined nodes and links which define the operational space for all vehicles.

Node—a defined point on the network, used to define, for example, a waypoint, platform, intersection, aggregated into paths.

Vertex—an intersection node which joins three or more edges.

Edge (Link)—section of the Graph connecting two unique vertex neighbors. Edges can be either unidirectional or bidirectional.

Cost—the metric used to calculate the time or distance taken to traverse an edge.

Track—is a directed graph with costs applied to all links.

Waypoint—a node of known location which allows a vehicle to link time and distance data with a known location in the physical world.

Origin—starting point for a specific journey.

Destination—end point for a specific journey.

Merge intersection—where two or more paths converge at an intersection on a single physical point, which presents a collision risk.

De-merge intersection—where an incoming vehicle along a path is presented with two or more choices for exiting the intersection.

Flat cross intersection—where two or more paths cross such that vehicles occupy a common area for a distance, but vehicles continue on their path with no merge or demerge options.

Platform—a predefined node where passengers can enter or exit a vehicle.

Depot—a set of nodes in close proximity with similar functions e.g., maintenance.

Station—a collection of platforms.

Parking—a set of nodes where vehicles can be stored while not performing jobs. Also "parked" describes the state of a vehicle not performing a job.

Segment—a defined non-overlapping subset of the network. Sizes can vary.

Job—a vehicle journey, which can be future, present or past.

Path—an area available for a vehicle to travel along.

Route—the ordered set of edges and vertices that a vehicle passes through from origin to destination.

Collision—two or more vehicles occupying any common physical space at the same time.

Bi-directional—vehicles can run on a bi-directional segment in either direction.

Utilization—the number of vehicles passing through a node as a percentage of the theoretical maximum capacity.

Dwell time—the time spent by a vehicle at a platform at rest picking up or setting down passengers.

Euclidean co-ordinates—describes a point in 2D (x, y) or 3D (x, y, z) space and can include specific systems such as latitude and longitude.

Slot—refers to a moving potential single unit of capacity defined by both time and location. An available slot at a point on the network is a specific size and only available for a defined period of time.

Future log—similar to a conventional event log, but with times in the future, containing events which are planned.

To aid in understanding the system and method of the present disclosure an exemplary illustration of an on-demand closed transport system is used. While the vehicles in the example run along prescribed paths, the system of the present disclosure can equally be used to control other closed transport networks and vehicles in both 2D and 3D space. This is able to include vehicles that are capable of steering themselves as well as those that are steered by the infrastructure (e.g., a subway car on a track, as a non-limiting example).

Referring now to FIG. 1, a diagram of a closed transport system 100 is depicted according to embodiments of the present disclosure. The closed transport system 100 ("the network") includes a network control system 105, which is the principal command system for the network. The network control system 105 includes a network controller 160, which among several functions is operable to autonomously generate collision-free routes for vehicle journeys within the closed transport system 100. The network control system 105 includes a safety system 180, which is operable to verify safe operation of the components of the network (including vehicle transit). The network control system 105 further includes reporting and administration system 170, which provides a human interface and external data access for both customers and administrator staff 175. In addition to the network control system 105, the closed transport system 100 includes an independent safety control system 190 operable to monitor and intervene in functions regarding high-risk system operations. The network control system 105 is communicatively coupled to all components within the closed transport system 100, such that it can both issue instructions and receive data from the components of the network.

In operation, the closed transport system 100 includes a number of vehicles 110, which are wholly controlled by command instructions issued from the network control system 105, in order to perform journey requests 115 for members of the public 130. A member of the public 130 makes a journey request 115, specifying a destination 165 (e.g., platform 'G'). In some embodiments, the current location (or nearest pickup location) of the member of the public 130 is used as the origin point 140 (e.g., platform 'A') of the requested journey 115. Additionally or alternatively, the member of the public 130 is able to specify any particular origin point as the desired pickup location. A vehicle 110 is then provisioned by the network controller 160 to perform the requested journey 115. The vehicle 110 can already be present at the origin point (e.g., at platform 'A'), or alternatively can be controlled by the network controller 160 to transit from another location within the closed transport system 100 to the journey origin point. The vehicle 115 travels solely along closed transport system 100 infrastructure 125, which can be roads, tracks, rails, tunnels, or any other infrastructure capable of transporting the vehicles 115. The location of the vehicle 110 is monitored both by on-vehicle sensors and sensors 135 embedded within the closed transport system 100. Once the vehicle is available at the origin location for the member of the public 130 to board, the network controller 160 generates a collision-free route to transit the member of the public 130 from the origin to the destination. The route is characterized by the nodes in the network that are traversed, e.g., the nodes of the system including origin 140, destination 165, merge 145, waypoint 155, merge 150 (of flat cross type). In general, the generated route is the shortest route along the infrastructure; that is, the shortest of the many possible paths provided by the infrastructure. Once generated, the network controller 160 sends a journey instruction set 120 that specifies to the vehicles the precise steering and speed instructions corresponding to the generated route. Once received, the vehicle 110 proceeds to autonomously execute the instructions of the journey instruction set 120, transporting the member of the public 130 from the origin to the destination. Along the journey, the network controller 160 monitors the vehicle progress, the safety system 180 receives information from both the vehicles 110 and sensors 135 to verify safe operation of the journey, while the independent safety control system 190 monitors high-risk system operations (e.g., transit through flat cross 150), and intervenes in execution of the journey if an unsafe condition is detected.

Regarding infrastructure 125, the overall capacity (e.g., the number of vehicles 110 operating at one time) in the closed transport system 100 is increased by utilizing grade separation, where a physical space is dedicated to only one particular mode of transportation. For example, a subway has a tunnel to which a particular train is dedicated at a particular time—there are no other types of vehicles that travel along the tunnel, and there is only ever one train at a given point of the tunnel (no collisions). Generally, the greater the proportion of grade separation within the overall system, the higher the vehicle throughput the system is capable of achieving.

Figure 2:
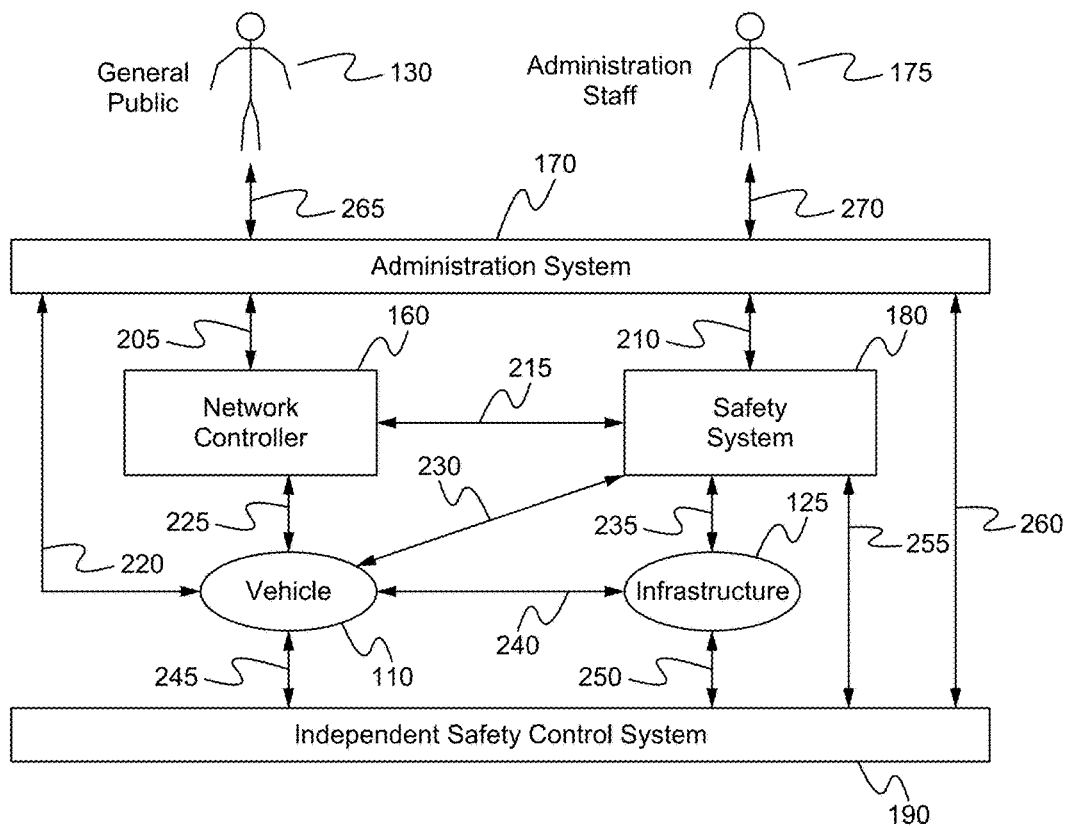
FIG. 2 is a schematic overview depicting components of a closed transport system along with their respective communication relationships, according to embodiments of the present disclosure.

FIG. 2 depicts in schematic form components of the closed transport system 100, along with their respective two-way communication relationships, according to embodiments of the present disclosure. A vehicle 110, which traverses along infrastructure 125, is able to communicate with the network controller 160, the administration system 170, the safety system 180, the independent safety control system 190, and the infrastructure 125, via communication pathways 225, 220, 230, 245 and 240, respectively. The network controller 160 is further communicatively coupled with the administration system 170 and the safety system 180 via communication pathways 205 and 215, respectively. The administration system 170 is further communicatively coupled with the member of the public 130, administrative staff 175, the safety system 180, and the independent safety control system 190 via communication pathways 265, 270, 210 and 260, respectively. The safety system 180 is further communicatively coupled with the infrastructure 125 and the independent safety control system 190 via communication pathways 235 and 255, respectively. The independent safety control system 190 is further coupled with the infrastructure 125 via communication pathway 250.

Figure 3B:

FIGS. 3A-3B is a table 300 depicting operation data flows between the components of the closed transport system 100 (e.g., those components of FIG. 2), according to embodiments of the present disclosure. The table 300 indicates the direction of the data flow, including the source and recipient of the data. For example, real-time exception reporting and operating logs are sent from the administration system 170 to the safety system 180, while administrative personnel overrides are sent from the administration system 170 to the safety system 180. Thus, communication pathway 260 is bi-directional, as are all of the pathways.

Network Controller

The network controller 160 is the primary command center for the closed transport system 100, providing mapping, route selection, collision-free path planning, and resource management including job allocation, optimization and vehicle control across a network of predetermined paths. Each vehicle (e.g., vehicle 110 of FIG. 1) is capable of following a route using a set of speed and direction instructions (the journey instruction set 120). The route, speed and timing for each vehicle's journey are predetermined by the system, requiring no ad hoc load management techniques such as a stop sign. Vehicles maintain a repeatable, predetermined speed for each segment. The network controller maintains various profiles and data for the closed transport system 100, as described below.

Sectional speed profiles are maintained, such that each path segment of infrastructure 125 has its own specific running speed. All vehicles will generally run at exactly the running speed along that section (an exception can be an emergency vehicle, under certain circumstances), where the desired velocity is reached following an initial period of prescribed acceleration. Straight sections are typically run at faster speeds than tight turns, in order to reduce journey time. In order to transition between speeds in a predictable way each acceleration and deceleration event between different speed zones has a specified and predictable acceleration/deceleration profile. This ensures that the time taken for the section is precise and predictable, serving to maintain fine journey tolerances.

Acceleration/deceleration profiles are maintained, which are defined using a jerk value and max G force to produce a comfortable and repeatable acceleration profile, with a maximum acceleration level. Combinations of jerk and maximum G force are grouped together to provide three levels of acceleration (gentle, regular and heavy). Combined with the pre-acceleration and post-acceleration speeds a repeatable acceleration profile (time and distance) is produced. This method requires the vehicle to use this input to set its speed over time, however the network controller 160 can also provide an acceleration profile, including throttle inputs-versus-time, or speed-versus-time.

Steering profiles are maintained, such that each vehicle receives data enabling it to execute the correct turn at the appropriate time. Many vehicle types have a significant array of sensors and require less data to perform the appropriate turn. For these vehicles the steering profile data is able to be as simple as 'from point x follow the path to the left until point y,' to a series of detailed steering angle inputs (a record for every 0.1 m interval to use a specific steering head angle). For vehicles that require additional information a full set of turn angles related to either distance or time is provided, which the vehicle inputs into its steering control system. An alternative for vehicles following a line path is to provide data on the merge or de-merge of the lines, which the vehicle then follows (e.g. path de-merges at distance x, follow left line). The data type is dictated by the vehicle capability and is stored in the network database.

Waypoint data are maintained, such that each vehicle has an onboard sensor data feed to determine where it is at any point in time (e.g., motor speed or axle counters). Waypoints provide a separate terrestrial-based data source that allows the vehicle to periodically verify that it is in the correct location. The precise location and ID of each waypoint is recorded by the network controller 160, forming part of the journey instruction set 120 when linked with a precise passing time. These precise locations data enable logging of future valid intersection pass-through events along with corresponding times (e.g., when a vehicle is scheduled to pass through each intersection, also known as an intersection's future log). A further feature is that locations of vehicle types available to perform categories of jobs (e.g., delivery, emergency, passenger, etc.) are tracked. Also, a snapshot of the typical capacity utilization for each intersection for each block of time is enabled.

If Euclidean coordinate data (x-y co-ordinates or latitude/longitude) are used, these are collected at regular intervals (nodes) across the entire closed transport system 100. The shorter the intervals, the more accurate the vehicle route execution and control is able to be. The vehicles preferably have access to highly accurate real-time location data across the entire network at all times. Whilst the graph data structure (e.g., from layout database 405) is used for routing purposes, precise Euclidean data can be used for a number of purposes, including but not limited to:

Defining waypoints

Defining other points in the closed transport system 100, including location of parking, maintenance, platforms, etc.

Defining the start and end of steering and acceleration commands provided to vehicles Location reporting for the closed transport system 100

Current satellite-based GPS systems are not always capable of providing the level of accuracy required to run the vehicles throughout sections with particularly small headways, and additionally the GPS signal can be too weak in indoor or undercover areas. A highly accurate terrestrial based system can be more robust, in certain embodiments.

In continuation of the discussion above regarding the profiles and data the network controller 160 maintains, vehicle data is stored regarding each vehicle in order to render each vehicle uniquely identifiable. Furthermore, information about each vehicle's configuration maintained, e.g., maximum load or passenger number, wheelchair-compatible, or specific vehicle uses including ambulance.

Headway data are maintained, enabling the system to enforce a consistent minimum headway between vehicles. This ensures that vehicles maintain a consistent distance apart. Lower headway values enable more precision in the vehicle control, at a higher risk of collision. Lower headway values also increase system capacity. Headway values can correspond to the nature of each section of infrastructure—for example, headway values (as measured in seconds) can be greater in slow running areas such as stations, and reduced when at-speed on the backbone of the closed transport system 100.

Individual vehicle identification is maintained, enabling the system to identify each vehicle uniquely to handle data and communications, location, diagnostics, speed, path updates etc. This identification data can include vehicle usage rights.

Average load times are maintained, related to each vehicle or vehicle type. The network controller 160 is able to make estimates for loading and unloading times, based on accumulated data (e.g., past journeys completed). While network controller 160 is operable to learn from its operating history to better estimate these times, an initial input estimating the load times can be made.

The location(s) of special zones in the closed transport system 100 are maintained—for example, zones for maintenance, storage, charging, safety exits, etc. User data are maintained as well, for example to monitor access and for billing purposes.

Figure 4:
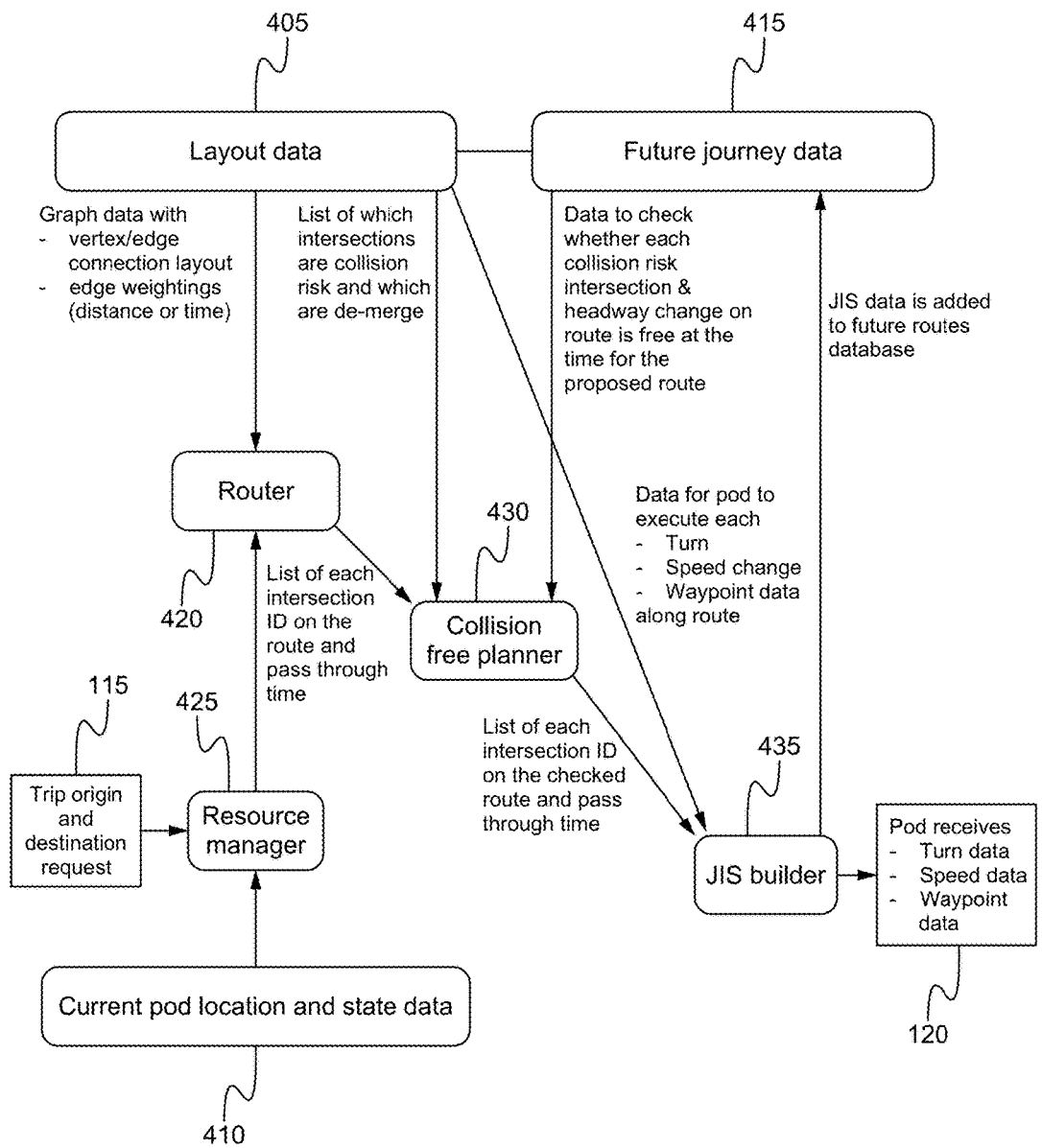
FIG. 4 is a schematic diagram depicting exemplary components and data flows of a closed transport system network controller, according to embodiments of the present disclosure.

Referring now to FIG. 4, a schematic diagram depicts exemplary components and data flows of a closed transport system network controller (e.g., network controller 160), according to embodiments of the present disclosure. The network controller 160 includes four components that receive data from a number of data sources. At a high level, the resource manager 425 is operable to manage incoming job requests (e.g., by queuing), and to allocate a vehicle to service each job. As described herein, the router 420 is operable to determine an optimized route from origin to destination. Optimization can be made according to a number of metrics, as described in greater detail herein. The collision-free path planner 430 is operable to determine a path that is collision-free, at the time the vehicle is projected to pass through each portion of the path. The Journey Instruction Set Builder 435 is operable to generate a final journey instruction set for the vehicle to execute.

Many of these data are used by the network controller 160 to build the final journey instruction set 120, which is sent to the vehicle 110 for execution. The journey instruction set 120 includes, among other data, speed, steering, and waypoint data. An integral component of the network controller 160 operable to generate the journey instruction set 120 is the router 420.

Router

The task of the router 420 is to find the most efficient route between the journey origin and destination. The most efficient route can be defined as the route that transports the vehicle from origin to destination in the shortest amount of time—or alternatively, other metrics can be used to determine the most efficient route (e.g., least fuel/resources required). The router 420 receives as inputs data indicating the origin and destination of the journey, as well as network graph data. The router 420 outputs a route including a list of each vertex traversed (along with its unique ID and the calculated pass-through time), sequentially along the route.

The network controller 160 maintains a representation of the manner in which the infrastructure 125 is arranged in the closed transport system 100. The router 420 uses data representing the manner in which the infrastructure of closed transport system 100 is physically laid out, or structured, these data being stored in a layout database 405. This network layout data is typically stored in the form of a weighted directed graph.

Figure 5:
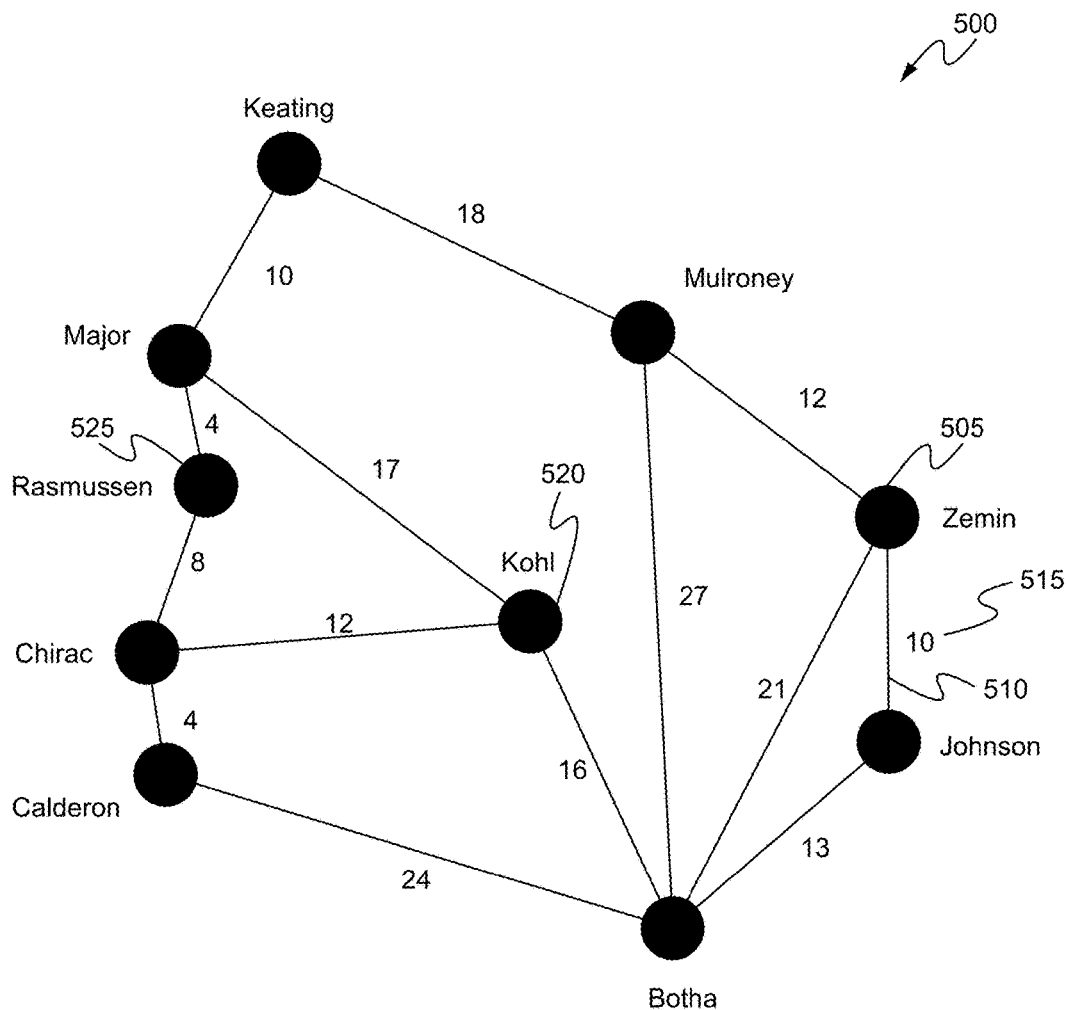
FIG. 5 is a directed weighted graph representing an exemplary infrastructure for a closed transport system according to embodiments of the present disclosure.

In particular, referring now to FIG. 5, a weighted directed graph 500 is depicted that describes an exemplary manner in which each node and edge is connected throughout a closed transport system. The weighted directed graph 500 includes a plurality of nodes 505, including platforms 520 (e.g., Kohl) and waypoints 525 (e.g., Rasmussen) connected by edges 510 having stored costs (or weights) 515.

In general, a directed graph includes vertices (intersections) and edges (non-intersection paths which join the vertices). The edges have costs which can represent either the time taken to traverse the edge, or a distance, or both. The stored data type (e.g., time or distance) is reflected for which attribute the router 420 subsequently optimises journeys. The visual representation of the graph does not show the actual shape of the network paths in 2D or 3D space. The weighted directed graph includes:

The manner in which each vertex and edge are connected
The costs of each edge (time, distance, or both)
Latitude/longitude of each vertex
Vertex type—merge, de-merge, flat cross
Waypoint location and ID
Special use zones such as recharging, maintenance, platforms, parking, etc.
Additional data such as headway changes As the graph is a virtual representation of the physical network, a significant number of measurements are made and the connecting structure data recorded in the generation of the weighted directed graph. In the case of edge data being stored as a distance, there are measurements of the length of the path that vehicles traverse between the vertices at either end. In the case of the edge being measured in time, the speed that the vehicle travels along the edge is taken into account to produce a time cost value. This is particularly useful when the vehicles travel the segment in a repeatable time and the routes are optimized for shortest journey time.

The structure of the network is also recorded. Each vertex is connected to at least three edges, and onto their connected vertices, in order to create a network. These connections between each uniquely identified vertex and edge also form part of the data set, so that the router 420 can find a number of possible path(s) from origin to destination. The directionality of each segment is recorded, where some or all segments can be bi-directional. Additional data describing the network can also be useful. Storing the latitude and longitude of each vertex, for example, can assist as an input to route calculations.

Any change to the physical network structure results in an update to the data of layout database 405. These can include new vertices, or edges, or changes to the costs for traversing edges. Making these changes is preferably not completed whilst vehicles are completing Journey Instruction Sets 120 across any affected segments.

Since the network infrastructure layout data 405 is processed in graph form, routing algorithms can readily generate a route including all vertices and edges contained within the route. Network controller 160 calculations for systems that do not include ad-hoc traffic management devices, or capacity related holdups that slow progress erratically, can be made somewhat simpler compared to those of present day commercial road map routing applications (which do include such features/characteristics). Additionally or alternatively, pre-processing of the layout data 405 is able to be performed, or heuristic inputs used, to speed up the route calculation process; however, typically the algorithms are sufficiently fast as to not require these to gain additional performance benefits.

A significant body of knowledge regarding routing algorithms already exists to perform the routing task (from origin to destination), and the router 420 can be set up to use a wide variety of algorithms, including but not limited to:

Dijkstra and bi-directional Dijkstra
A*
Bellman-Ford
Floyd-Warshall
Arc Flags
Table Lookup Many other routing algorithms are also possible for use by router 420; for example, *Route Planning in Transportation Networks* Technical Report MSR-TR-2014-4 published by Microsoft Research provides a comprehensive evaluation.

An alternative to calculating each route on demand—that is, as requested in real-time—is to build a database storing a lookup table of every possible origin and destination pair along with its respective route data. Whilst this produces a very large number of records (and would take significant time to compute), in certain scenarios such a lookup table is able to produce faster response times for router 420. MapReduce algorithms can also assist in reducing the processing load generated by router 420. Alternatively, a hybrid method exists, where the most common origin destination pairs (determined from journey histories) are pre-calculated, while the remainder of the route requests are constructed in real-time.

Generally, safely routing vehicles around the network accounts for the following considerations:

No two vehicles can occupy the same physical location; therefore the network controller 160 'locks' a physical location such that it is available to only one vehicle for a specific time window
Given there is always a performance and capacity limit imposed by the available transport hardware, the network controller 160 determines the manner in which to allocate the maximum number of available theoretical capacity empty 'slots' to match the level of journey demand and available vehicles
Each available capacity slot exists on a section of hardware for only a limited period of time
Headway value and the capacity of a segment are inversely related—the smaller the headway value the higher the capacity, but with a concomitant increase in the precision (of the control systems) with which execution of commands must be made
Across the entire network there are varying levels of demand and capacity, and many possible choices for each vehicle route
The network controller 160 determines how to safely route each vehicle from origin to destination. For a route to be valid there must be an empty capacity slot at the specified point in time for every step along the journey, while maintaining the prescribed safety headways
Journey instruction set 120 data includes speed profile, direction routing and waypoint data
Dealing with a number of passenger variables related to: time to load or unload; not arriving to start journey on time or at all; and emergencies that occur during the journey, etc.
Which type of vehicle is required for the journey
Any journeys which have special priority (e.g. emergency services).

While the router 420 is operable to generate a route from the layout data 405 that is configured to transport a vehicle from a specified origin to a specified destination, an integral feature of the present disclosure is the calculation confirming the route to be collision-free.

Collision-Free Path Planner

Figure 6:
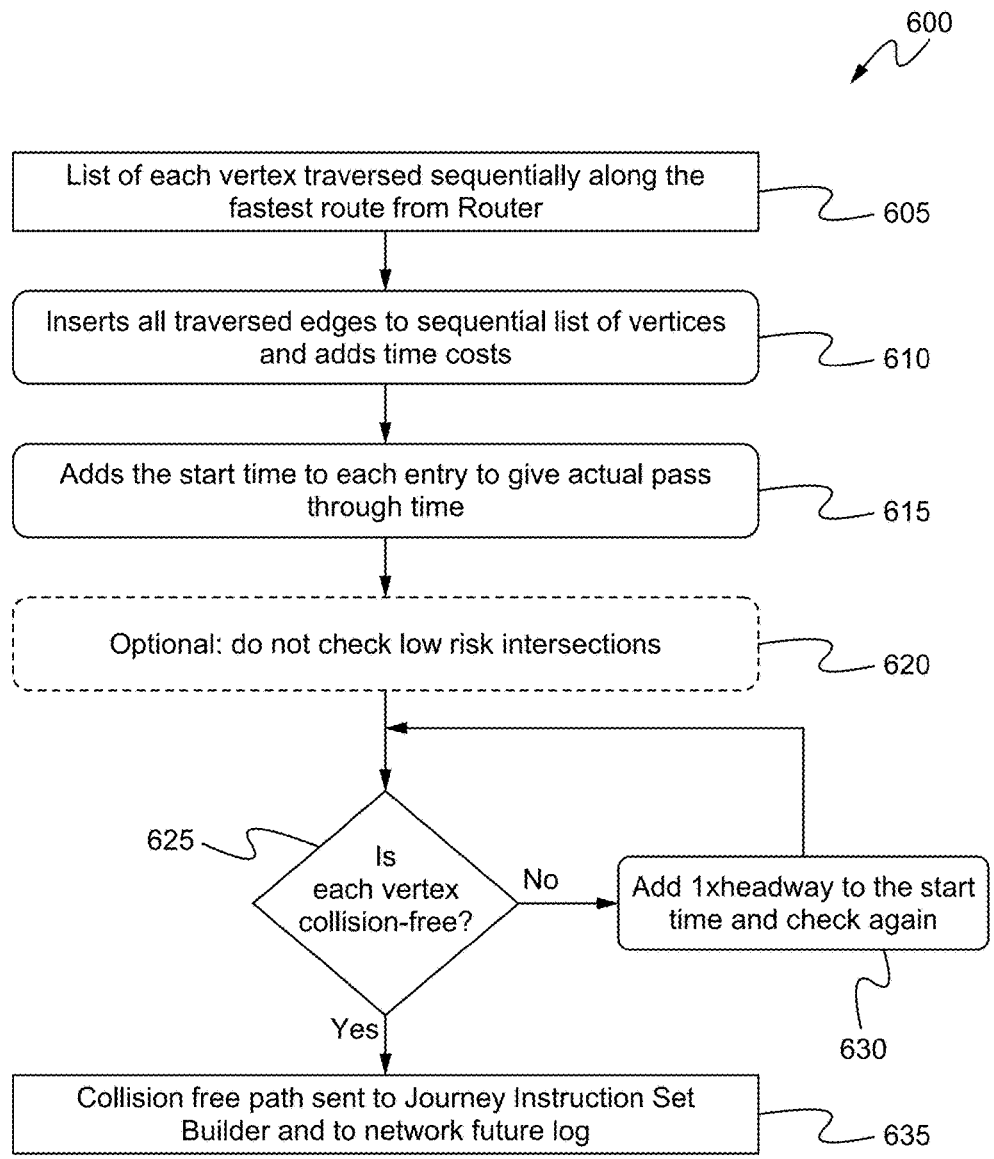
FIG. 6 is a flowchart depicting an exemplary process of determining a collision-free route by a closed transport network controller, according to embodiments of the present disclosure.

FIG. 6 depicts an exemplary process 600 of determining a collision-free route by a closed transport network controller 160, according to embodiments of the present disclosure.

The process 600 is performed by the collision-free path planner 430 of the network controller 160. At a high level, the collision-free path planner 430 receives the route provided by the router 420 as well as the next available journey start time for the requested route, and determines whether the path at that start time is collision-free. If the path is not collision free it adds 1 headway value or equivalent to the start time and checks the resulting intersection times again. Once the collision-free path planner 430 verifies that the calculated start time of the journey results in a collision-free journey, the route along with the verified start time is sent to the Journey Instruction Set Builder 435.

At the step 605 the collision-free path planner 430 receives a route corresponding to the requested journey 115. The route is generated from the router 420 and is in the form of a list, including a sequence of each vertex traversed along the route (typically corresponding to the fastest path from the origin to the destination). At the step 610 the collision-free path planner 430 requests and receives network layout data 405, which includes the edge data along with costs—e.g., distance or time to traverse—between each vertex of the route. The collision-free path planner 430 inserts these edges with costs between the vertices and sums them, generating a file with each vertex (including its unique ID) and edge along the route in sequential order and a pass-through elapsed time for each vertex starting at an initial time (t=0).

At the step 615 the collision-free path planner 430 receives the current vehicle 110 location, and calculates the earliest start time for the requested journey based on the current location and the origin point of the requested journey. The earliest available start time is calculated from the known vehicle location, intersection location and acceleration profile. The collision-free path planner 430 adds this start time to each entry in the file generated at the step 610, updating the file to reflect an actual (projected) pass-through time for the vehicle at each vertex of the route. Thus after the step 615 the file includes a list of each vertex and edge, in sequential order, with a 'true' pass-through clock time associated with each vertex.

The optional step 620 disables verification of collision-free paths at those vertices of the route that are considered low risk. The collision-free path planner 430 receives from the layout data 405 each vertex type along the route. Low risk vertices can be excluded from the collision-free determination. High risk vertices are of type merge and flat cross. For example if a vertex is a de-merge, that is, vehicles only separate paths at that point and do not cross one another, when the step 620 is performed the system does not verify those sorts of intersections for occupancy at the time, since there is no benefit. This is because a collision is of low likelihood (other than conventional nose-to-tail collisions) and the process 600 adds no value to combating the risk of collision. Therefore, when the optional step 620 is performed the only intersections that are checked are merge and flat cross type intersections. This can be determined based on processing loads for the network controller 160, as removing low risk vertices from the collision check will reduce processing requirements. If this is preferred, the route file to be checked (e.g., the file from the step 615) is populated with the field designating vertex type, including merging, de-merging and flat cross intersection classifications, with the purpose that only merging and flat cross are checked. If not, each vertex is occupancy-time checked irrespective of type.

At the step 625 the collision-free path planner 430 requests information from the network controller 160 regarding the future state of each vertex along the route. The network controller 160 stores a database containing data on each vehicle in the closed transport system 100 that has a confirmed route, in particular, the times that each vehicle will be passing through each respective vertex across the network (an 'intersection future log'). The collision-free path planner 430 sends a request to the network controller 160 for each vertex to be checked to the future log database, along with the time to be checked, and receives a response as to whether the vertex is occupied. A vertex is considered occupied if any two vehicles are within 1× headway tolerances at either side of the vertex. In the condition of the collision-free path planner 430 receiving a response that any intersection on the route t is occupied, the route is deemed invalid. If the route is deemed valid the process 600 proceeds to the step 635, and the collision-free path planner 430 will pass the route on to the JIS Builder 435. If not, the collision-free path planner 430 continues to the step 630.

Step 630 is performed in the case where the route was determined to be invalid at the step 625. The collision-free path planner increments the start time of the route by 1× headway value—that is, if the longest headway for the route is 0.75 seconds, the start time of the route is incremented by +0.75 seconds for the file from the step 615, generating an updated file from the step 630. Alternatively, other headway values other than that of the longest headway can be used. The process 600 then returns to the step 625, where each vertex is checked against the future log to determine any anticipated collisions. This process of iterating the start time of the route by 1 headway continues until a valid route (as defined in the step 625) is found, and the process 600 proceeds to the step 635, where the collision-free path planner 430 sends the verified route to the Journey Instruction Set (JIS) Builder 435.

In the case where there are multiple options available (e.g., multiple platforms for one destination station that provide an equivalent outcome), the collision-free path planner 430 selects an appropriate platform and checks that it is collision-free. Alternatively or additionally, more than one platform in a station can be tested. The collision-free path planner 430 also checks bi-directional sections along the route so they are 'locked' for one direction at a time.

Regarding routes including sections having variations in headway, the collision-free path planner 430 verifies these change points in a similar way to a de-merge intersection. For example, a decrease in headway is accounted for by an increase in speed (where vehicles move further apart but run faster), while a headway increase is comparable to a merge intersection since the capacity of pre- and post-headway change segments are different. The available capacity is less for a 2 second headway compared to a 0.5 second headway, which presents a heightened risk of nose-to-tail collisions.

Journey Instruction Set Builder

Figure 7:
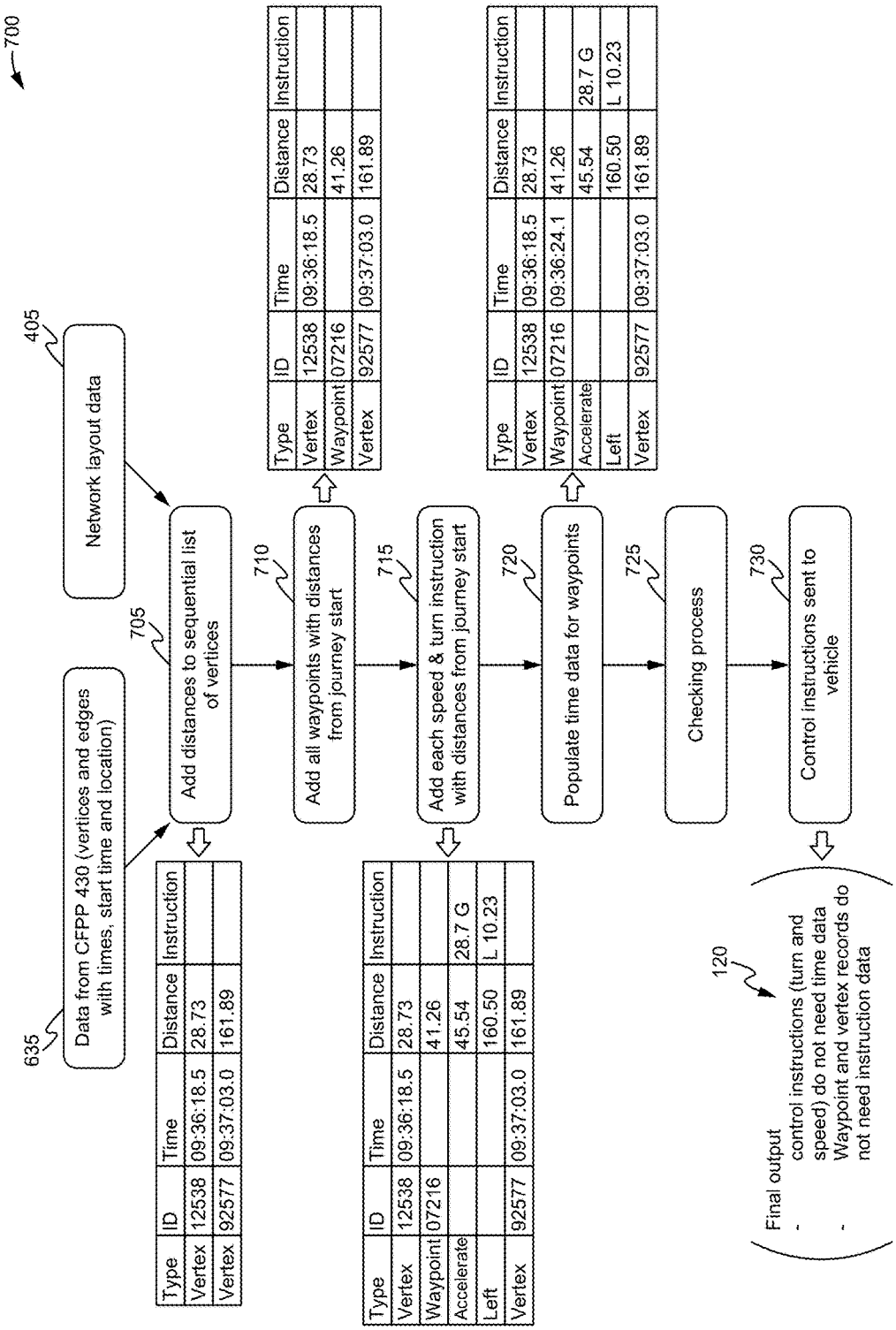
FIG. 7 a flowchart depicting an exemplary process of generating a journey instruction set for controlling a vehicle to execute a journey in a closed transport system, according to embodiments of the present disclosure.

Once the collision-free path planner 430 has verified a route to be collision-free, it forwards the route to the Journey Instruction Set (JIS) Builder 435. Referring now to FIG. 7, a flowchart depicts an exemplary process of generating a journey instruction set 120 for controlling a vehicle to execute a journey in a closed transport system, according to embodiments of the present disclosure. At a high level, the JIS Builder 435 takes the output 635 from the collision-free path planner 430 and transforms it into a journey instruction set 120 that a vehicle 110 is able to use to execute a prescribed route. This process 700 includes formatting the collision-free route data and inserting any additional data into the JIS Builder 435 to allow the vehicle to control speed and steering and verify that its execution of the route is consistent and precise.

At the step 705, the JIS Builder 435 inputs, from collision-free path planner 430, each vertex and its corresponding pass-through time, and the journey starting time and starting location (expressed as edge ID and linear distance along, or Euclidean co-ordinates). The network layout database 405 is likewise received by the JIS Builder 435 at the step 705. The JIS Builder 435 adds distances (from the layout data 405) to the vertices listed in the route from the collision-free path planner 430. For Euclidean co-ordinates this can either be calculated or requested from a database if pre-calculated. At the step 710 the JIS Builder 435 adds to the file waypoints contained along the route, along with their respective distances from the journey origin. Waypoint data are used to verify that the vehicle is in the right place at the right time. The distance of a waypoint from the journey start can be calculated, or the Euclidean co-ordinates are requested, and the result is inserted into the journey instruction set 120 along with the waypoint RFID numbers.

At the step 715 speed and steering instructions are updated with the appropriate distances from the journey origin. For each edge the journey passes along, the JIS Builder 435 references the data regarding steering and speed changes required (from one edge to the next). Each edge has its Euclidean co-ordinates (or distance from the journey start) added and inserted into the JIS 120.

The journey instruction set 120 now contains each record that the vehicle will need to execute the journey; however, the waypoint data is still incomplete. For a waypoint to be used it preferably has both a journey distance (or Euclidean co-ordinates), and a time component. At the step 720 the JIS Builder adds time data to be associated with each waypoint, by calculating the time that the vehicle should reach the waypoint given the acceleration profiles and the location of the waypoint along the route. Waypoint-associated time data enables the closed transport system 100 to monitor the actual progress of the vehicle 110 against the expected (pre-determined) progress of the vehicle according to the journey instruction set 120.

At the step 725 the JIS Builder 435 performs a checking process to verify the data contained in the updated file. The JIS Builder 435 checks the journey instruction set 120 by: verifying again that each vertex is available at the specified time; and/or re-calculating that the time and distance records all synchronise accurately, given the starting time and speeds.

At the step 730 the JIS Builder 435 outputs the journey instruction set 120 to the future log database 415, as well as an encrypted copy to the receiving vehicle 110. The journey instruction set 120 is a data structure including the following: record type (vertex, accelerate, turn, waypoint); ID (for vertex, waypoint records); time (for vertex and waypoint records); distance (all records, can also take Euclidean form); and, instruction data (turn and accelerate records).

One role of the JIS Builder 435 is to transform the route data into instructions that a vehicle can execute in order for the vehicle to follow the prescribed route. The data brought in from the collision-free path planner 430 includes each vertex that the vehicle 110 will pass through, along with the precise timing of those pass-through points to ensure a collision-free route. However, the vehicle 110 needs particular data to execute the route precisely. These data include:

Vehicle run speed—since a vehicle is starting its journey from rest, it requires acceleration and deceleration points, a target speed to accelerate to, and an acceleration magnitude (e.g., how hard to accelerate). These inputs being executed in a precise and repeatable way causes the vehicle to reach its required speed at the same location in a repeatable manner.

Vehicle steering—provides a vehicle information on which direction to move toward. A vehicle's steering system has conventionally been controlled by a human via mechanical linkages; however these methodologies are now changing. Alternative forms of steering include electronic inputs that control the steering mechanism. These can include but are not limited to the rotational angle of a stepper motor controlling the steering angle of a vehicle's front wheels. In the case of the steering performed by the infrastructure, the steering data are sent to the infrastructure steering control system and not to the vehicle.

Vehicle location—the capability of verifying that the vehicle is in the right place at the right time, and the capability of making adjustments to course-correct. Each vehicle has a number of methods of checking its location and trajectory. These include onboard sensors such as axle counters, motor speed, etc. Onboard sensors, however, account for variables such as wheel slip with reduced accuracy. The vehicle, in order to accurately know its position in relation to its surroundings, can rely upon additional data inputs. These take the form of terrestrial or other externally based sensor input, which measures the vehicle location from a known point. Indeed, waypoints are precisely known locations along a path. Waypoints can be either passive—such as a reflector attached to the ground—or active, such as an RFID tag. GPS or other triangulation based systems can be used to provide data when the GPS data are sufficiently accurate. Waypoints can provide data in 1D, 2D or 3D space.

Additional data—in some embodiments a vehicle requires other data, such as altitude (for flying or suspended vehicles), which is handled in a similar fashion to steering and other data above.

Resource Manager

For each journey to be executed, a vehicle is required. An empty available vehicle can already be located at the passenger's origin, or it can be called to that location when not already present. The journey made by the empty vehicle to the passenger origin is treated in a similar way to a load carrying journey; the system needs to create an origin and destination, create a route, verify it is collision free, create the journey instruction set 120, and send it to the vehicle and monitor progress.

Figure 8:
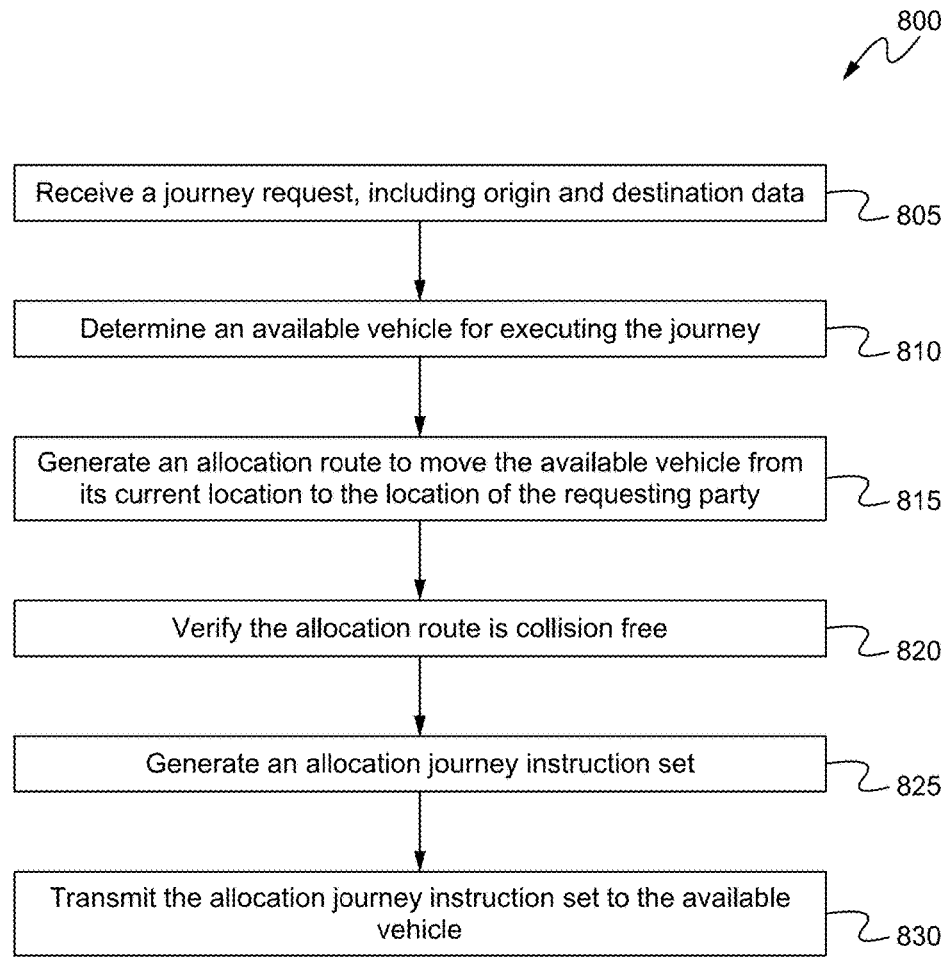
FIG. 8 is a flowchart depicting an exemplary process of allocating a vehicle to execute a requested journey in a closed transport system, according to embodiments of the present disclosure.

Referring now to FIG. 8, a process 800 of allocating a vehicle of the closed transport network to perform a requested journey is depicted according to embodiments of the present disclosure. The allocation is performed by the resource manager 425 of the network controller 160. At the step 805 the resource manager 425 receives a journey request, including information indicating the origin and destination points of the requested journey. At the step 810 the resource manager 425 determines, out of a number of vehicles present in the closed transport system 100, an available vehicle to perform the requested journey. At the step 815 the resource manager 425 requests the router 420 to generate an allocation route. The allocation route sets an origin point of the available vehicle, and uses the origin point of the requested journey as its destination point. At the step 820 the resource manager 425 then requests the collision-free path planner 430 to verify the allocation route is collision-free. At the step 825 the resource manager 425 requests the JIS Builder 435 to generate an allocation journey instruction set, which at the step 830 is transmitted to the available vehicle for execution to bring the available vehicle to the origin point of the requested journey.

In general, the resource manager 425 performs two roles: 1) At a micro level to find the most appropriate vehicle for a specific passenger trip via scoring metrics; 2) At a macro level to move available vehicles to areas of highest likely demand to reduce wait times.

Regarding finding appropriate vehicles for a specific passenger, the resource manager 425 uses a job queue to prioritize journeys in the system. To determine which job in the queue should be serviced next, an operator 175 can choose to implement a standard FIFO (first in first out) queue system, or they can add a series of metrics to score each request. These metrics can include weightings for some or all of:

Time that request is received
Passenger quantity—for example, preferential weighting for a multi passenger trip over single occupant. This alternatively can be used to generate an adjusted man hours metric
Cargo importance factor—VIP passenger, high security cargo, urgent destination e.g. hospital
Distance minimization—reducing energy consumption, vehicle and infrastructure wear and tear
Network capacity
Impact on other passenger arrival times
Other operator requested scoring metrics Each of the above metrics is allocated a weighting indicating the relative importance of that factor out of 100%. Furthermore each possible outcome within each of the above is also scored (for example the priority difference for a 1 person journey vs. a 2 person journey). In the case of the allocation being simply FIFO then the weighting is 100% on the time of request receipt. Generally, the job with the highest score is the next to be allocated. High importance factors can include emergency services that should begin their journey as quickly as possible. In some cases extremely high priority jobs can require re-routing of other existing journeys to facilitate the earliest arrival time. Conversely, moving empty vehicles around the network can have a lower than standard importance factor.

The resource manager 425 is also operable to ensure that the correct vehicle type is selected to perform a requested journey, and to locate the closest appropriate vehicle. A 'time to job origin' is calculated by the resource manager 425, by adding the time until the end of the current job (if the vehicle is currently occupied and includes an unloading time estimate) to the time to travel to the job origin. Any rights over vehicles (private or special use) are also verified.

Regarding maximising available vehicles close to future demand origins, a number of empty vehicles will need to move back into the higher density portions of the closed transport system 100 after their initial journey. For example, during an evening peak demand period passengers may want to head to outlying residential areas from a city office district. Conversely to service a football game the vehicles wait near the stadium during the game to service the post-match demand.

The resource manager 425 employs machine learning to learn over time the patterns of demand for each network, so as to reduce the collective wait times for an empty vehicle to be available at journey origins. Macro usage patterns are identified as follows:

Predictable regular patterns—based on factors such as time of day, day of week, school and public holidays. Available vehicles can be moved in advance to reduce waiting times for service delivery. Vehicles can be stationed at platforms and parking zones nearby. Consideration can be made of the cost from wasting energy to move vehicles if demand is lower than expected, or resulting in poorer performance across other network zones.
Predictable irregular patterns—special events that are known in advance and should be planned for in advance on a case by case basis examining previous occurrences and expected demand volumes. Demand from semi predictable patterns or short warning patterns such as weather are also managed.
Unpredictable patterns—can be shown by a spike in waiting times for an area or a large unexpected volume of requests. Additional data should be sought by operator to determine the volume of jobs to expect and to route available vehicles to the location if appropriate. The system has either failed to predict or is not capable of managing demand generated from this source.

Additional Network Controller Processes

As capacity requirements increase and available capacity decreases for a specific network layout a number of additional processes can be added to the core functionality of the network controller 160.

Router 420 Produces Multiple Route Options

In certain cases producing one fastest route from origin to destination, then checking for a collision-free path every headway interval does not provide the soonest arrival at the destination, for example when the selected intersections are very busy and the system has to wait for an extended period until it can begin the journey. The router 420 is operable to produce additional, alternate routes that avoid the congested segments, based on data that provides utilization for each merge and flat cross intersection. The alternative routing process includes:

Building a data table which holds, for each 10 minute block of time at each merge and flat cross intersection, the utilization as a percentage of maximum capacity
Form the initial fastest route with a list of intersections and times for the vehicle to pass through
Assign, for each merge and flat cross intersection and time record, a likely utilization percentage
Rank the intersections according to their utilization
Request a new route from the router 420, removing the two most highly utilized intersections as pass through options
Perform the above request for a second alternative route, but with removal of the five most highly utilized intersections
Calculate the time for two additional routes above When calculating the collision-free paths, once the original fastest route has the number of headways added that brings its total to be equal or greater than the time of the faster untested route, begin running that untested route through the collision-free path planner 430 in parallel. In the case of both of these routes becoming slower or equal to the third route, that third route is checked in parallel.

This process requires additional processing power; however, it is capable to produce a route that allows the vehicle to arrive at its destination sooner—even if the route is not the most direct—by avoiding high utilization segments. The data used to build the utilization list of the intersections along the preferred route is from the current active future log for each intersection.

Slot Hopping

Under some conditions running vehicles at their standard maximum section speed does not generate the route with the soonest arrival at the passenger destination. For example, in the case where the system, in order to generate a complete end-to-end collision-free route, determines the vehicle needs to wait for some time for the journey to start. Under such conditions if the vehicle were to slow down on one section of its journey (assuming there are no other affected vehicles behind), that slowdown can allow a path through subsequent intersections that would otherwise not be available. If the time lost during the slowdown is less than the delay in starting, the vehicle's arrival time at its destination will be sooner even though the time in transit is longer. This process is known as 'slot hopping' since the vehicle slows down to occupy an empty slot behind it rather than its original slot. In certain conditions even stopping for a period (e.g. in a siding) can produce an earlier arrival time than what would be produced considering delay in waiting for a start time.

To perform a slot hopping process, the collision-free path planner 430 is modified such that when it determines the next intersection checked is not available (e.g., at the step 625), rather than start again from the beginning with a later start time (e.g., the step 630), the collision-free path planner 430 backtracks to the edge prior to that vertex, checking if there is a vehicle behind (e.g., refers to the future data log), and then re-determines the intersection availability again at the new slot time. If the intersection is free at that (new) time, the collision-free path planner 430 continues checking subsequent vertices using that modified time onwards. As an additional advantage to the earlier start times the slot hopping can produce, the capacity at the origin (e.g. a platform) can be increased since the vehicle dwell time at the platform is shorter.

Optimizing Routes

In addition to the network controller 160 generating a valid route from origin to destination providing a collision-free path, the network controller 160 is also operable to optimize routes. An optimization process can occur either prior to the start of a journey or during a journey, and is able to involve a large number of vehicles.

The optimization functionality is able to make changes to one or many vehicle routes. Routes are optimized according to the scoring metrics; these metrics improve in accuracy as network-wide usage increases, or as more journeys are added or changed in the network. An increase in the data available (regarding completed journeys) provides additional visibility and additional processing power, which allows for greater network optimization (for example, measured by a total network score across all journeys).

The optimization process can be computationally expensive (e.g., compared to computational cost of routing), because a larger number of possible permutations and combinations are scored across a large number of vehicle routes. Optimization in this context refers to a more efficient use of available resources. One or more journeys is able to be re-routed with a lower score in some individual metrics or for a smaller number of vehicles, overall a higher network score is produced.

During times in closed transport system 100 operation when the network has no capacity bottlenecks, the routing algorithm typically generates a route that is the shortest distance from origin to destination. During times when there are capacity constraints, moving one stream of vehicles away from the bottleneck enables additional journeys to take place that otherwise would not proceed, or in other instances, enables a much shorter journey for some vehicles with other vehicles requiring only a slightly longer journey.

The optimization function creates a range of different journey combinations and tests each to achieve the maximum network score. Optimization also makes changes to individual journeys, for example when a journey is cancelled or changed another journey can have a route change to make its score higher. Generally the routes are changed before the journey starts, but the system is enables routes to be altered during a given trip. The vehicle journey is optimized considering a number of factors, including some or all of:

Journey time
Start time delay
Arrival time
Journey length
Passenger quantity
Cargo importance factor
Energy consumption
Vehicle and infrastructure wear and tear
Passenger comfort
Network capacity
Hardware performance factors (e.g. vehicles possess poorer traction in rain)
Impact on other passenger arrival times Each of these metrics is weighted, and contributes to a route score which determines the route selected by the network controller 160 as the best route. Since each vehicle's route is usually impacted by other vehicle routes, optimization is preferably performed network wide. The degree of route optimization can be increased with increased computational processing. More time spent processing will usually produce a more highly optimized total network performance score. However, processing power and processing time are finite. The network controller 160 therefore uses its limited resources of processing power and time to maximize the network wide performance score.

The network controller 160 determines how much processing to dedicate to a specific optimization task. To do this the network controller 160 references the performance history for similar segments, the theoretical maximum level of optimization and the potential total upside available, the expected increase in optimization for each additional unit of computing, and the current needs for processing in other segments. In addition to routing of vehicles with similar performance, the network controller 160 can also control vehicles of varying performance, e.g. planes with different minimum and maximum airspeeds.

Segmentation and Clustering

The network controller 160, in particular the router 420, is operable to divvy up portions of the network when calculating route in the case where the network grows to a significant size—both infrastructure complexity and vehicle volumes. The divvying can be termed 'segmentation' or 'clustering,' and serves to transform the overall routing process from one monolithic calculations to a number of smaller, more manageable calculation. This approach can be useful for network conditions such as:

Long distances between central control systems and the infrastructure location result in lag in communicating that exceeds a performance threshold
Communication bandwidth is limited
Processing power required of one central control system becomes overwhelming or uneconomic In particular, the graph (e.g., graph 500) can be segmented into clusters such that routing is performed on a cluster-by-cluster basis. A cluster can be either 1) statically defined by geography—e.g., the physical border between one cluster's area of responsibility and its neighbour is fixed, or 2) dynamically defined—e.g., the areas of responsibility under the control of each cluster can move to some degree; for example, if one cluster is under heavy processing load, one of its neighbours can take over some of the area of responsibility to share more equally.

While the statically defined methodology does not require a negotiation process for determining which cluster controls which vehicles in the closed transport system 100, the dynamically defined methodology does. Alternatively the cluster can be defined per vehicle—for example, a group of vehicles is controlled by one cluster no matter where they travel across the network 100. Clustering can therefore result in lower cost of distributed processing power, possible redundancy, and shorter communications paths.

Station Manager

One factor regarding estimating the journey time is the load/unload time of a passenger at the vehicle. Whilst is it possible to predict with a high level of certainty the ingress or egress of a passenger from a vehicle, it is not absolutely predictable. The goal of the network controller 160 station manager module (not shown) is to maximize the utilization of the available hardware capacity within the station, whilst avoiding any queue. The station manager helps the closed transport system 100 to handle the unpredictable nature of the passenger.

In the case of a platform being blocked by a passenger's very slow ingress or egress, the station manager is operable to re-route an incoming vehicle to a free platform. The station manager module is activated by the network controller 160 in situations where the required capacity is close to the theoretical capacity of the station (minimal spare capacity)—for example, when the spare capacity is above 85% of the theoretical capacity.

The setup and effectiveness of the station manager module is dependent on the hardware available, and includes one or more of:
  Spare platforms for the station manager's use only (reserved from the regular network controller 160 functions)
  Low utilization platforms that the station manager can divert incoming vehicles to if other platforms are engaged
  Long platforms which can accommodate multiple vehicles at once The station manager can be set up to take different degrees of control. For example, the network controller 160 generates routes taking the vehicle all the way to the platform (making assumptions about setdown and pickup times), and the station manager only takes control of a vehicle when there is a detected issue with timing at a platform (e.g., a potential collision detected, based on sensor 135 data). This functionality represents a first increase in capacity management compared to embodiments where no station manager is present. Alternatively, the network controller 160 is able to route vehicles to the station entry, at which point the station manager allocates the vehicle to a platform.

Generally, the station manager maintains a list of available platforms and a list of incoming vehicles, matching the two in order to load/unload passengers 130. The station manager routes incoming vehicles to the appropriate available platform and monitors ingress and egress times. In the case of the station manager determining that an over-capacity situation is highly likely, it routes one or more vehicles into an emergency siding to provide temporary capacity relief. If no other options are available, the station manager can request an area wide emergency shutdown.

Administration System 170

The administration system 170 is the administration interface layer between the control system 105 and any human users or administrators 175. It performs the following functions:
  Graphically represents the network 100 in the control centre for staff
  Provides access to logs including search functions and analysis
  Shows any operational warnings issued by the safety system 180, including:
    Any breaks in medium continuity
    Vehicle onboard diagnostic warnings
    Vehicle breakdowns
    Vehicle outside normal operating tolerances or collision imminent warnings
    Collisions
    Infrastructure or vehicle sensor issues
    Maintenance requirements on infrastructure or vehicle
    Status of maintenance yards or charging/refuelling stations
    Infrastructure capacity levels in use
    Capacity warnings
    Vehicle utilization and other operational statistics
    Energy usage
    Freight usage statistics
  Enables call centre staff or computer responders to reach out to passengers in vehicles in the event of a passenger-initiated incident
  Enables staff to see inside and outside of a vehicle in the event of an issue or diagnostic requirement
  Facilitates any contact to passengers on the status of any changes to their journey
  Provides data feeds to customer interfaces including websites or phone apps
  Enables staff to engage manual override of some functions, e.g. closing routes
  Receives requests for journeys from potential passengers
  Vehicle ownership and usage rights
  Passes journey requests to the network controller 160
  Responds to passenger with journey details
  Provides information for in vehicle screens
  Provides an API to link to other systems e.g. billing or platform turnstiles Administration system 170 also creates a network management score to determine how efficiently the system is performing. This score can be used to log the performance over time and to examine the impact of changes to the network control system 105 software. Its metrics are weighted, and include:
  Journey time
  Start time delay
  Arrival time
  Journey length
  Passenger volumes transported
  Cargo importance factor fulfilled
  Energy consumption
  Vehicle and infrastructure wear and tear
  Passenger comfort
  Network capacity
  Hardware performance impacts (e.g. poorer traction in rain)
  Impact of optimization s
  Safety incidents
  Breakdowns and maintenance performance It will be appreciated that gains in some performance metrics can result in losses in others, and such trade-offs are fine-tuned in line with the goals of the operator 175.

Safety System 180

Transport systems, including those that are autonomously operated, need multiple layers of redundancy to ensure a safe journey. The safety system 180 has a number of safety layers, including:

- Central safety system 180 monitors vehicle performance and is operable to deploy anti-collision measures (both hardware and software)
- Each vehicle 110 has onboard sensors to detect obstacles in front of it for collision detection. Vehicles are configured to initiate collision avoidance if required.
- Accurate GPS location system on vehicles 110
- Infrastructure-based sensors 135 locate every vehicle at all times
- Infrastructure 125 includes sensors along each segment, enabling detection along a route of any break in continuity of a paths
- Central control software algorithms prevents the sending of two vehicles to the same location at the same time
- Human operable emergency button in vehicles enable passengers 130 to initiate an emergency state, and human customer service by administration staff 175 can communicate with passengers 130
- Immediate shut downs can be performed system-wide, or for specific flexible segments
- Re-routing to take one vehicle out of circulation as quickly as possible, or re-routing multiple vehicles to create a larger safety buffer around a vehicle determined to be off course
- Separate high risk safety subsystem e.g., independent safety system 190, intervenes at precise control level for collision avoidance
- In intersections vehicles can use two or more sensor/guidance subsystems, including virtual guide along the 'floor' and sensor reflectors at fixed points, enabling location determination via triangulation
- Live duplicates of the systems which can be hot-swapped in and out The safety system 180 uses portions of the data maintained by the network controller 160 for its initiation, as well as:

- The self-diagnostics capability of the vehicles, including: service interval; fuel/battery; sensor calibration; acceleration, deceleration, steering; onboard electronics diagnostics; and operating parameters (such as temperatures)
- An indication of how regularly the safety system 180 should request operating health parameters and for which metrics
- Infrastructure sensor calibration processes
- A series of instructions about how to handle scenarios such as breaks in path continuity or vehicles operating outside acceptable tolerances
- Action logic for each possible case, including:
  - Which metrics are considered
  - The combination of metrics to define each case
  - Cases covering all metric ranges and combinations (comprehensively exhaustive)
  - Case metric combinations that are unique (mutually exclusive)
  - For each case there is at least one outcome (including do nothing)
  - Cases can also take into account a number of variables such as the specific type of medium or class of medium, load, capacity, speed, intersection type, proximity to exit, etc.

Figure 9:
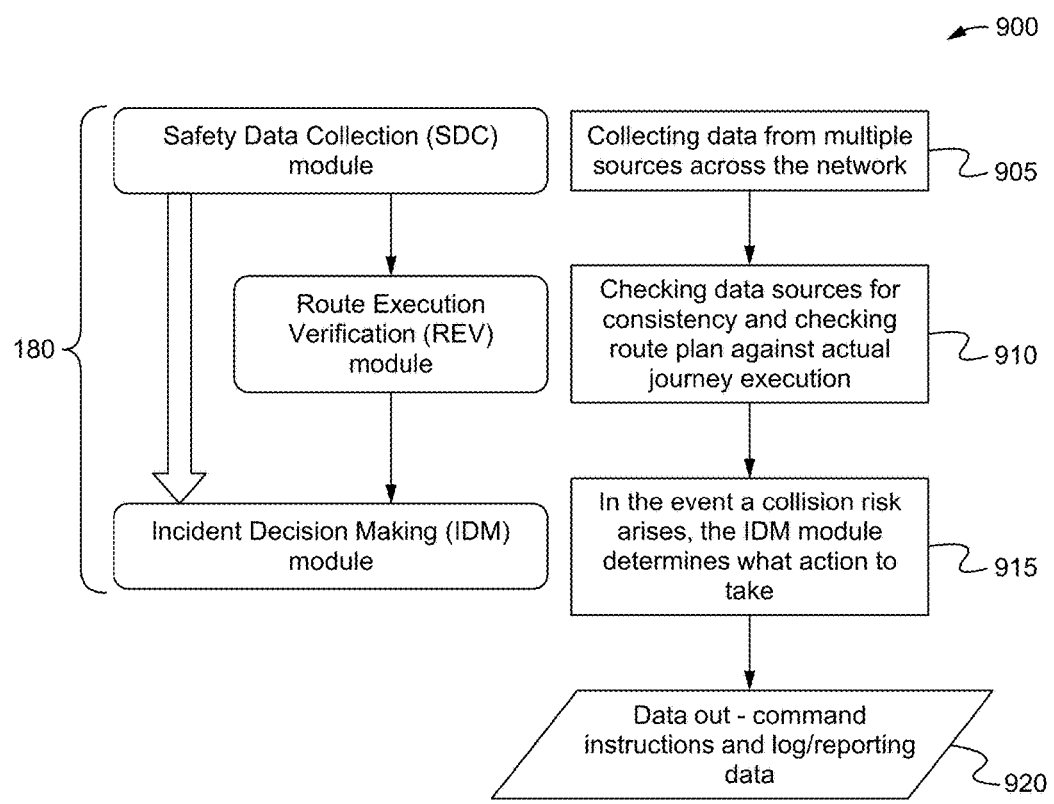
FIG. 9 is a schematic overview depicting safety system components of a closed transport system along with their respective communication relationships, according to embodiments of the present disclosure.

Referring now to FIG. 9, a schematic overview depicts a process 900 of responding to a safety incident, according to embodiments of the present disclosure. At the step 905 a safety data collection (SDC) module of the safety system 180 collects data, in real-time, from vehicle onboard sensors and infrastructure sensors 135 to determine the location and velocity of each vehicle in the closed transport system 100. At the step 910 a route execution verification (REV) module of the safety system 180 verifies data sources for consistency, and compares planned routes against the actual journeys that vehicles are performing. At the step 915 an incident decision making (IDM) module of the safety system 180 makes a determination to alter or to leave un-altered the route of a vehicle, based on the data from the REV module in the step 910. At the step 920 the IDM module then outputs data, including any command instructions to vehicles deemed to require a change in route, as well as log and reporting data.

Regarding the step 905, the infrastructure-based monitoring detects each vehicle's location and speed and reports this back to the safety system 180, storing in its database. The safety system 180 monitoring systems are independent of the onboard intelligence of the vehicle 110, and serve to monitor any hardware issues with the infrastructure (e.g. physical continuity or blockages), or sensor performance; any detected defects in these are able to be reported directly to an incident decision making (IDM) module of the safety system 180. Onboard sensor monitoring includes a vehicle 110 having its own set of sensors to determine its location and speed. There are two classifications of sensors; 1) those which collect data from an entirely onboard system (e.g. axel counters or motor speed, which do not account for slip), and 2) those which use an external terrestrial or other known position to collect data. The vehicle 110 periodically sends this data to the SDC module of the safety system 180, or alternatively, the SDC module requests these data from vehicles. Each vehicle can perform "health monitoring" by monitoring a range of performance metrics and reporting the results back to the safety system 180. The safety system 180 can also send a request to the vehicle to complete any specific self monitoring activities at any point in time if the safety system 180 detects a condition indicating a potential safety issue. This can also include sensor calibration activities or diagnostics from the steering or drive systems, batteries, doors etc. Warnings regarding a potential vehicle collision are also included. If a vehicle 110 detects a situation that it outside its own series of acceptable operating parameters (from its onboard collision detection system) it will report the related data to the safety system 180. In a condition where the safety system 180 receives a collision detection warning from a vehicle it determines the manner this correlates with its internal model of where vehicles should be (e.g. from vehicle journey instruction sets 120 of vehicles), and with the data received from the independent infrastructure based detection systems. In addition to vehicle system reports, the infrastructure based sensors 135 also report any risk of collision.

Regarding the step 910, the REV module of safety system 180 examines each of the data sources to determine whether they are consistent and whether the vehicle is executing its journey instruction set 120 within tolerances or not. If the performance is outside of tolerances it is flagged as a potential incident and escalates the vehicle for additional investigation. The REV module compares the vehicles' planned journey instruction sets 120 with the actual vehicles' execution on the infrastructure 125, determining whether the actual performance of the vehicles falls outside acceptable tolerances. In the case of a route execution parameters being within tolerances, the REV module determines no action need be taken. In the case of the data inputs from the various sources containing unacceptable variance, the REV module determines which data is likely to be the most accurate representation of the vehicle's current location and velocity metrics. Escalating any vehicle's unacceptable journey execution sends data to the IDM module for further analysis. Also, any sensors detected to be faulty are reported, indicating need for repair.

At the core, the REV module is determining a response to three queries; 1) Are the sets of data consistent or is variance outside acceptable tolerances; 2) Which data are most accurate; and 3) Is the vehicle execution of the journey instruction set 120 within operating tolerances? Regarding the first (are the sets of data consistent), two specific sets of data—location and velocity—are determinative. The position and speed of each vehicle is monitored by the safety system 180, in real-time, via multiple sensors. The vehicle's onboard set of sensors fall into two main categories—onboard and external known point. Under ideal operating conditions both sets of these sensors provide very similar outputs. However, under a number of circumstances, including but not limited to wheel slip, poor sensor calibration, faulty sensors, tampering, calculation error, etc., there can be inconsistencies. In addition there are sensors located at points along the routes which measure the location and identity of each vehicle. Each data stream should correlate. Setting the acceptable tolerance threshold can be stated as a distance or time or percentage of headway. Alternatively, it can be a dynamic calculation which takes into account known areas of discrepancy across the network, especially when each vehicle is affected in a similar fashion (e.g. an uphill segment), or for weather patterns, likelihood of vehicle overloading etc. Combining these influences into a factor which can be applied for example to explain high levels of wheel slip or falling behind the journey instruction set 120 performance expectations helps to make discounting a data stream more rational.

Regarding the second question (which data are most accurate), in the case of the data streams being deemed to be outside the acceptable range, the REV module determines which data the safety system 180 should rely on. For a speed or discrepancy regarding a specific vehicle it is far more likely that a fixed sensor along the path is accurate if all previous vehicle data from that sensor has correlated well. However these sensors can be spaced at distances which on their own do not provide the resolution required for precise control. Fixed sensors will, however, provide a calibration point of truth whereby the other data streams can be verified at that specific point and time. In some embodiments this function uses a factor system similar to the tolerance determinations to calculate which input stream is more likely to be accurate. In addition to this, preferential weightings to fixed location (infrastructure-based non-mobile) sensors followed by onboard vehicle sensors which use an external fixed point, followed by onboard sensors using onboard measures should also be taken into account. Alternatively, calculation of a hybrid of the data inputs can be made, or to only use one set of inputs but make assumptions about the interim periods if the data resolution is too low.

Regarding the third question (vehicle execution of the journey instruction set 120 within operating tolerances), calculations are performed to compare the expected speed and location at a point in time (from the journey instruction set 120) to the actual speed and location, from the most accurate data feed. The variations in location can be expressed as a percentage of headway, or absolute time or distance. The variations in speed are also expressed as a percentage. Tolerance calculations are typically based on a percentage of headway, beyond which it is deemed unsafe to continue normal operations. For example, if two vehicles are operating at a variation of 50% of headway in a direction towards each other, there is certainty of an impending collision.

Throughout the REV module processes, any sensor (vehicle or infrastructure-based) deemed to be inaccurate is recorded and brought to the attention of a repair agent. Its data stream also can be excluded. All other consistent performance variations are also generally examined by the technical team.

Regarding the step 915, the IDM module of safety system 180 examines the data received from the step 910 in order to determine if any action is required, and if so, which action is the most effective at bringing the vehicle back within tolerances. Any instructions resulting from this determination are then sent for execution (e.g., the step 920). There are a number of potential incident scenarios that warrant action by the IDM module. For example, when the data sources are inconsistent, a determination of the source of the inconsistency is made (e.g., a known outage), as well as which source of data is the most consistent, reliable and trustworthy. If the vehicle and infrastructure sourced data streams show the vehicle is off course, the scenarios include: 1) the vehicle does not think it is off course but the systems can be synchronized and the vehicle brought back to acceptable operating tolerances; and 2) The vehicle does not think that it is off course due to an error in sensors or an error in executing the journey instruction set 120. Synchronization fails or the operating tolerances are not recoverable. Remediation actions (see below) should be taken.

In cases where the data sources are consistent, there are two prevailing scenarios; 1) the vehicle is aware it is off course and is making the required changes to course and is likely to remain within acceptable operating tolerances; and 2) the vehicle is aware it is off course but is not able to make the required changes to course. In case 2) remediation is required.

Further incident scenarios leading to IDM module activity include: loss of full or partial communications with the vehicle; loss of full or partial control over the vehicle's speed or steering systems; discontinuity of path or other physical issue; and communications, connectivity, other sensor issues, etc.

The decision for whether to act is calculated using a number of specific criteria. If any one of the criteria exceeds its maximum score the IDM module will act and if the aggregate score exceeds the maximum threshold the IDM will act. Each threshold level is a trade-off between minimizing risk to safety and any impacts on the capacity, resource usage and smooth running of the system. They are set by an operator according to their risk aversion level. Scores assess how far out of acceptable tolerance the route execution is, the likelihood of collision or other suboptimal occurrence, and the severity of the potential risk.

Calculation factors for vehicle performance compared to tolerance include determination of the variation of actual location from expected based on the journey instruction set 120, e.g., as a percentage of headway or as absolute distance/time. They also include the variation of speed from the journey instruction set 120, e.g., as a percentage variation and absolute velocity variation.

The likelihood of collision or other suboptimal occurrence assesses: free capacity of the vehicle's route segment at a micro level (is there a vehicle in front or behind); network utilization at a macro level (how busy is the segment generally at this time); assessment of current trajectory and location of vehicle likely to impacted; time to possible impact; and the likelihood that the vehicle is able to self correct.

The IDM determines the severity of the potential risk (what is the worst that could happen), assesses the number of other vehicles affected, the magnitude of the impact (in terms of change in speed), the type of impact (nose to tail, side on in merge, T-bone in flat cross), and the type of load.

In deciding how to act, the IDM will, from a list of all remediation options, isolate which are applicable as an effective response. The validity of many of these options is dictated by (1) their location in relation to the vehicle and the other surrounding vehicles and (2) the available level of control over the vehicle at risk of collision. The remediation options include: re-route the vehicle in question—possibly off the main network to a safe location; re-route other vehicles to create a larger safe buffer zone around the vehicle in question; issue an emergency stop command to either a network subsection or across the entire network—this could be the case if the time window available to re-route the affected number of vehicles is shorter than the time required to perform the re-routing calculations; deploy the vehicle's onboard independent electronic or physical (brake) emergency stop systems; deploy an external steering and speed control unit; deploy infrastructure based vehicle arrester (frontal barrier or attaches to rear or underside); if the risk of downside is very low, there is sufficient spare capacity and headway and the IDM determines high likelihood (over 75%, for example) that the vehicle can be brought back within acceptable performance parameters it attempt to do so; and do nothing as the IDM module assesses the risk and downside as minimal (e.g. a known sensor or other malfunction or no other nearby vehicles).

The IDM module, in determining which of the above options are valid for consideration, analyzes the following:
 a) is the vehicle responding to commands
 b) Is the vehicle's speed and steering control functional
 c) Is it near a vehicle arrester
 d) Can a tug be deployed nearby The IDM module further analyzes the manner in which to deploy the response to greatest effect and minimal disruption—each option from the list of available options is scored on:
 a) Effectiveness (likelihood of fixing the issue)
 b) Impact on passenger/freight
 c) Impact on network
 d) Other costs The IDM module then proceeds to issue specific commands corresponding with the determined response. In certain cases these require co-ordination with the network controller 160, for example: issuing vehicle commands to the errant vehicle; issuing commands to neighboring vehicles, across a zone or the network; tug commands (dispatching a vehicle to transport the affected vehicle); and arrester commands.

Further functions of safety system 180 include a vehicle time sync, in which the safety system 180 accurately synchronizes the onboard vehicle clock to a precise standard (e.g., through use of the NTP protocol). Any vehicle clock drift is reported, and any beyond a threshold is investigated by a maintenance team. According to some embodiments vehicle clocks are synchronized at least once a day and can be synchronized at the start of each journey. Another function includes vehicle diagnostics, in which the safety system 180 periodically requests the vehicle to run diagnostics across its systems including steering, acceleration, sensors, batteries, doors, communications systems, etc. The results are stored by the safety system 180, and if determined to be outside acceptable parameters, the vehicle can be directed to a maintenance yard.

Independent Safety Control System 190

The independent safety control system 190 is a safety system, independent of network controller 160, that is more closely connected to sites determined to have a higher than normal risk. The locations where a collision is most likely across the closed transport system 100 are intersections and locations having changes in headway. While the independent safety control system 190 is communicatively coupled with and can relay information back to the safety system 180, it is also able to operate independently. In the case of a break in communication with the safety system 180, the independent safety control system 190 can minimise the chance of an incident at its operation site. Typically, the independent safety control system 190 is configured not engage unless other possible safety options have been exhausted.

The independent safety control system 190 preferably includes the following setup information:
 1. Trigger tolerances for each metric similar to those described for the initiation of safety system 180, but relevant only to one high risk region
 2. Situation-based decision logic similar to above but only relevant to one high risk region
 3. Sensor calibration processes The independent safety control system 190 performs the following functions:
 Receiving data from the network controller 160 detailing each vehicle 110 that will pass through the segment, its path and timing
 Receiving data from its own independent sensors 135 surrounding the segment to locate vehicles as they travel towards the intersection
 Reviewing whether each vehicle 110 is arriving at the segment is within its acceptable performance window to pass through safely
 If the vehicle 110 arrives at the segment within the appropriate time window and passes through in the correct direction within the appropriate speed range, the independent safety control system 190 does nothing other than report its log data back to the safety system 180.

If the independent safety control system 190 detects a performance anomaly where vehicle location or journey execution falls outside the acceptable range, the independent safety control system 190 will choose to do one of: 1) issue a command to the vehicle to modify its speed to ensure it is within the prescribed performance range, 2) issue a command to the vehicle to complete an emergency stop, which can be for one vehicle or multiple if a number of vehicles are at risk, 3) issue a command for the infrastructure hardware (where available) to stop or redirect the vehicle. After each command the independent safety control system 190 monitors the vehicle for appropriate execution of the command. A report of the anomaly is made to the safety system 180, which can issue a request to the network controller 160 to re-route the vehicle(s).

Figure 10:
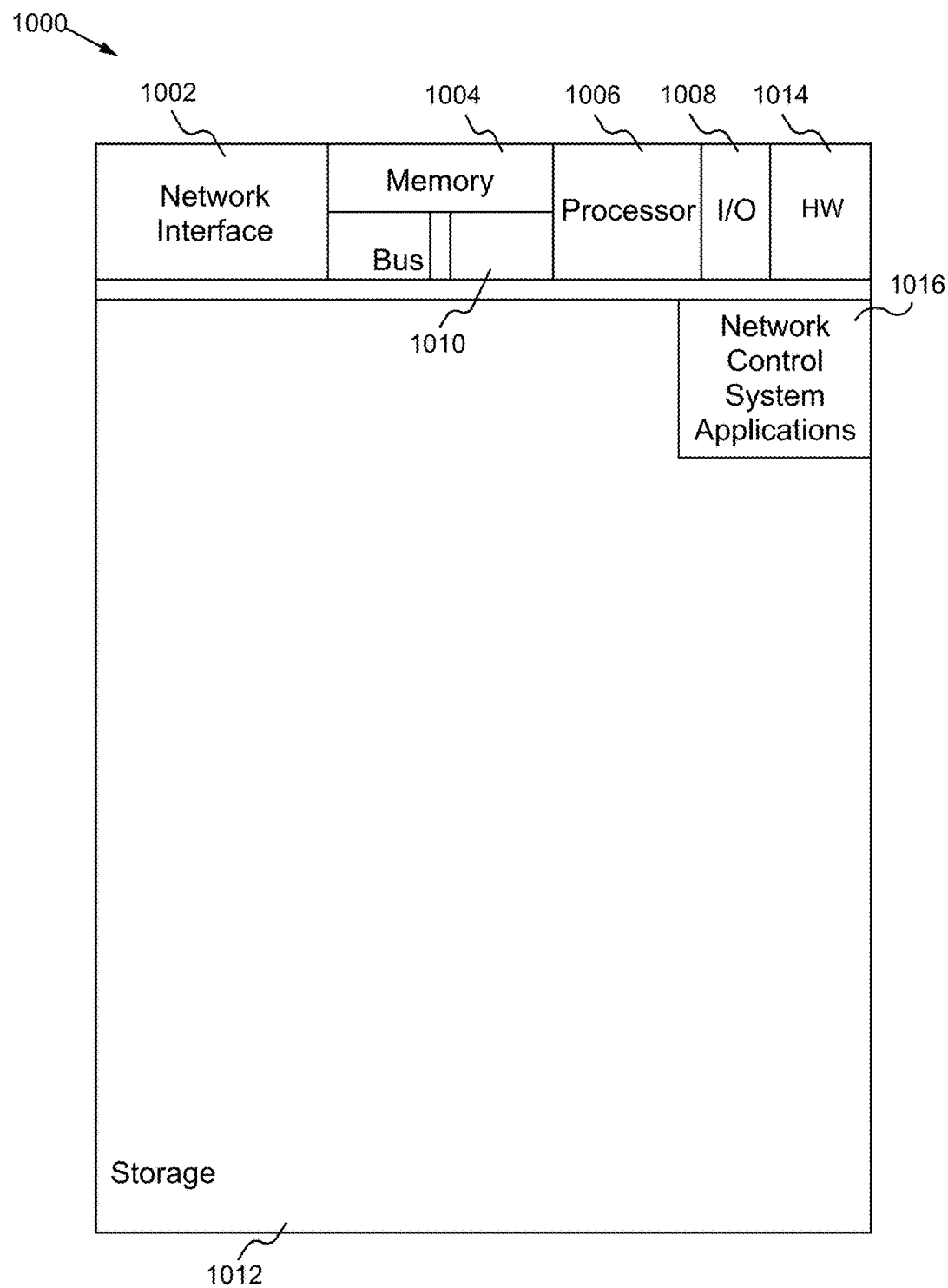
FIG. 10 illustrates a block diagram of an exemplary computing device according to embodiments of the present disclosure.

FIG. 10 illustrates a block diagram of an exemplary computing device 1000 according to an embodiment of the present invention. The computing device 1000 is able to be used to acquire, cache, store, compute, search, transfer, communicate and/or display information. The computing hardware implementing network control apparatus 105, including the independent safety control system 190 (e.g., of FIG. 1) can be similarly configured as the computing device 1000.

In general, a hardware structure suitable for implementing the computing device 1000 includes a network interface 1002, a memory 1004, processor(s) 1006, I/O device(s) 1008, a bus 1010 and a storage device 1012. The choice of processor 1006 is not critical as long as a suitable processor with sufficient speed is chosen. In some embodiments, the computing device 1000 includes a plurality of processors 1006. The memory 1004 is able to be any conventional computer memory known in the art. The storage device 1012 is able to include a hard drive, CDROM, CDRW, DVD, DVDRW, flash memory card, RAM, ROM, EPROM, EEPROM or any other storage device. The computing device 1000 is able to include one or more network interfaces 1002. An example of a network interface includes a network card connected to an Ethernet or other type of LAN. The I/O device(s) 1008 are able to include one or more of the following: keyboard, mouse, monitor, display, printer, modem, touchscreen, button interface and other devices. Application(s) 1016, such as those of the network control system 105 (the network controller 160, the administration system 170, the safety system 180) and/or the independent safety system 190 discussed above, are likely to be stored in the storage device 1012 and memory 1004 and are processed by the processor 1006. Greater or fewer components than those shown in FIG. 10 are able to be included in the computing device 1000.

The computing device 1000 can be a server or an end-user device. Exemplary end-user devices include, but are not limited to, a tablet, a mobile phone, a smart phone, a desktop computer, a laptop computer, a netbook, or any suitable computing device such as special purpose devices, including set top boxes and automobile consoles.

The foregoing description, for purpose of explanation, has been described with reference to specific embodiments. However, the illustrative discussions above are not intended to be exhaustive or to limit the invention to the precise forms disclosed. Many modifications and variations are possible and contemplated in view of the above teachings, including combinations of embodiments not explicitly recited as such. The embodiments were chosen and described in order to explain the principles of the invention and its practical applications, to thereby enable others skilled in the art to utilize the invention and various embodiments with various modifications as can be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A network controller for on-demand vehicle journeys in a closed transport system, the network controller comprising:
   a memory configured to store a weighted directed graph representing the closed transport system, and future journey data representing traffic on the closed transport system;
   a transceiver configured to receive a journey request from a vehicle, and to transmit control instructions; and
   a processor communicatively coupled with the memory and the transceiver and configured to:
   generate a route comprising an ordered list of vertices of the weighted directed graph, based on the journey request;
   determine route validity, including checking for any collision risk at each vertex of the route at a corresponding projected pass-through time for the vertex, based on the future journey data;
   generate a journey instruction set comprising vehicle control instructions corresponding to the generated route, including vehicle steering data and vehicle speed data; and
   transmit the journey instruction set to the vehicle.

2. The network controller of claim 1, wherein the future journey data includes a future pass-through log comprising vertex occupancy data corresponding to journey requests received from other vehicles in the closed transport system.

3. The network controller of claim 1, wherein a controlled separation between vehicles, defined as a headway, is maintained in the closed transport system.

4. The network controller of claim 3, wherein two vehicles projected to be separated by less than the headway causes the generated route to be determined invalid.

5. The network controller of claim 3, wherein upon determining the generated route invalid, the processor is configured to add a period of time corresponding to the headway to update the start time of the journey, and to re-determine route validity based on the updated start time.

6. The network controller of claim 3, wherein different headway values are maintained along different segments of the closed transport system.

7. The network controller of claim 1, wherein the processor is configured to update the future journey data to include the generated route.

8. A method of managing a plurality of vehicles for performing a requested journey on a closed transport system, the method comprising:
   receiving, at a network controller of the closed transport system, a journey request including origin location and destination data;
   determining, by a processor of the network controller, an available vehicle of the plurality of vehicles for executing the requested journey;
   generating, by the processor, an allocation route to move the available vehicle from its available location to the origin location of the requesting party;
   verifying, by the processor, the allocation route is free of any projected collisions;
   generating, by the processor, an allocation journey instruction set; and
   transmitting the allocation journey instruction set to the available vehicle.

9. The method of claim 8, wherein determining an available vehicle comprises ranking the journey request amongst a plurality of pending journey requests, based on at least one scoring metric, and selecting the available vehicle according to the ranking of the journey request.

10. The method of claim 9, wherein the at least one scoring metric is selected from: a time the journey request is received; a number of passengers in the requesting party; an importance factor of the requesting party; a distance minimization value for the journey request; a capacity value of the closed transport system; and an estimated impact on arrival times of other passengers corresponding to the plurality of pending journey requests.

11. The method of claim 10, wherein each of the scoring metrics has a corresponding weighting factor.

12. The method of claim 8, wherein the available vehicle is occupied, executing a pre-existing journey request, and the available location corresponds with a destination location corresponding to the pre-existing journey.

13. The method of claim 8, wherein the available location is determined based on an estimated future demand for journey requests in proximity to the available location.

14. The method of claim 13, wherein the estimated future demand is based on a machine learning algorithm applied to prior journeys in the closed transport system.

15. The method of claim 8, wherein verifying the allocation route is free of any projected collisions includes the network controller receiving data indicating the location of each vehicle present in the closed transport system.

16. The method of claim 15, wherein the location of each vehicle is based on sensors located within the closed transport system.

17. The method of claim 15, wherein the location of each vehicle is based on corresponding sensors located within each vehicle.

18. A network controller for providing control instructions to autonomous vehicles, on-demand in a closed transport system, the network controller comprising:
 a memory configured to store a weighted directed graph representing the closed transport system;
 a transceiver configured to receive a journey request, and to transmit a journey instruction set of control instructions; and
 a processor communicatively coupled with the memory and the transceiver and configured to:
  determine a journey route corresponding to the journey request, including a series of segments comprising an ordered list of vertices and waypoints of the weighted directed graph;
  determine distance values from an origin of the journey route corresponding to each vertex and waypoint of the journey route;
  generate vehicle speed and steering values corresponding to each segment of the journey route;
  combine the vehicle speed and steering values for each segment to form the journey instruction set; and
  control the transceiver to transmit the journey instruction set to the vehicle.

19. The network controller of claim 18, wherein the processor is further configured to generate and include in the journey instruction set a waypoint time for each waypoint of the journey route, each waypoint time corresponding to an estimated pass-by time of the vehicle at that particular waypoint.

20. The network controller of claim 18, wherein the memory is further configured to store future journey data, including a future pass-through log comprising vertex occupancy data corresponding to journey requests received from other vehicles in the closed transport system.

21. The network controller of claim 20, wherein the processor is configured to determine a start time for the vehicle to begin executing the journey route based on the vertex occupancy data.

22. The network controller of claim 1, wherein at least some of the traffic is bi-directional.

* * * * *